US006192360B1

(12) United States Patent
Dumais et al.

(10) Patent No.: US 6,192,360 B1
(45) Date of Patent: Feb. 20, 2001

(54) METHODS AND APPARATUS FOR CLASSIFYING TEXT AND FOR BUILDING A TEXT CLASSIFIER

(75) Inventors: Susan T. Dumais, Kirkland; David Heckerman, Bellevue; Eric Horvitz, Kirkland; John Carlton Platt, Bellevue, all of WA (US); Mehran Sahami, Stanford, CA (US)

(73) Assignee: Microsoft Corporation, Redmond, WA (US)

( * ) Notice: Under 35 U.S.C. 154(b), the term of this patent shall be extended for 0 days.

(21) Appl. No.: 09/102,946

(22) Filed: Jun. 23, 1998

(51) Int. Cl.$^7$ .................................................. G06F 17/00
(52) U.S. Cl. ................................ 707/6; 2/5; 2/101; 2/102
(58) Field of Search ........................... 707/2–6, 103–104, 707/200–206; 345/473; 382/132; 706/15–20

(56) References Cited

U.S. PATENT DOCUMENTS

| | | | |
|---|---|---|---|
| 6,115,052 | * | 9/2000 | Freeman et al. ...................... 345/473 |
| 6,115,488 | * | 9/2000 | Rogers et al. ........................ 382/132 |
| 6,115,708 | * | 9/2000 | Fayyad et al. ............................ 707/6 |

FOREIGN PATENT DOCUMENTS 0 747 846   12/1996   (EP) .

OTHER PUBLICATIONS

Sopena et al., "Neural networks with periodic and monotonic activation functions; a comparative study in classification problems", Artificial Neural Networks, Sep. 1999, ICANN 99, Ninth International Conference on (Conf. Publ. No. 470), pp. 323–328 vol. 1.*

Nakagawa, "A novel chaos associative memory", Neural Information Processing, Nov. 1999. Proceedings, 6th International Conference on, pp. 1106–1111, vol. 3.*

Stamatis et al., "Forecasting chaotic cardiovascular time series with an slope multilayer perception neural network", Biomedical Engineering, IEEE Transactions on, pp. 1441–1453, Dec. 1999.*

T. Joachims, "Text Categorization with Support Vector Machines: Learning with Many Relevant Features", Proceedings of the 10$^{th}$ European Conference on Machine Learning, Chemnitz, Germany, Apr. 21–23, 1998, pp. 137–142.

E. Osuna et al, "An Improved Training Algorithm for Support Vector Machines", Neural Networks for Signal Processing VII, Proceedings of the 1997 IEEE Signal Processing Society Workshop, Amelia Island, 1997, pp. 276–285.

Y. Yang et al, "A Comparative Study on Feature Selection in Text Categorization", 14$^{th}$ International Conference on Machine Learning, ICML'97, Nashville, Tennessee, Jul. 8–12, 1997, retrieved from http://www.cs.cmu.edu/{(yiming/papers.yy/m197.ps, School of Computer Science, Carnegie Mellon University, Pittsburgh, PA, and Verity, Inc., Sunnyvale, CA.

U.S. application No. 09/102,837, Horvitz et al., filed Jun. 23, 1998.

Thorsten Joachims, "Text Categorization with Support Vector Machines: Learning with Many Relevant Features", LS–8 Report 23, University of Dortmund, Computer Science Department, Nov. 1997.

Hinrich Schütz et al, "A Comparison of Classifiers and Document Representations for the Routing Problem", Xerox Palo Alto Research Center, Palo Alto, CA, and Rank Xerox Research Center, Meylan, France, no date.

Yiming Yang et al, "A Comparative Study on Feature Selection in Text Categorization", School of Computer Science, Carnegie Mellon University, Pittsburgh, PA, and Verity, Inc., Sunnyvale, CA, no date.

Yiming Yang et al, "An Example–Based Mapping Method for Text Categorization and Retrieval", Mayo Clinic, May 1994.

* cited by examiner

Primary Examiner—Thomas G. Black
Assistant Examiner—David Jung
(74) Attorney, Agent, or Firm—Michaelson & Wallace; Peter L. Michaelson

(57) ABSTRACT

A text classifier and building the text classifier by determining appropriate parameters for the text classifier.

44 Claims, 12 Drawing Sheets

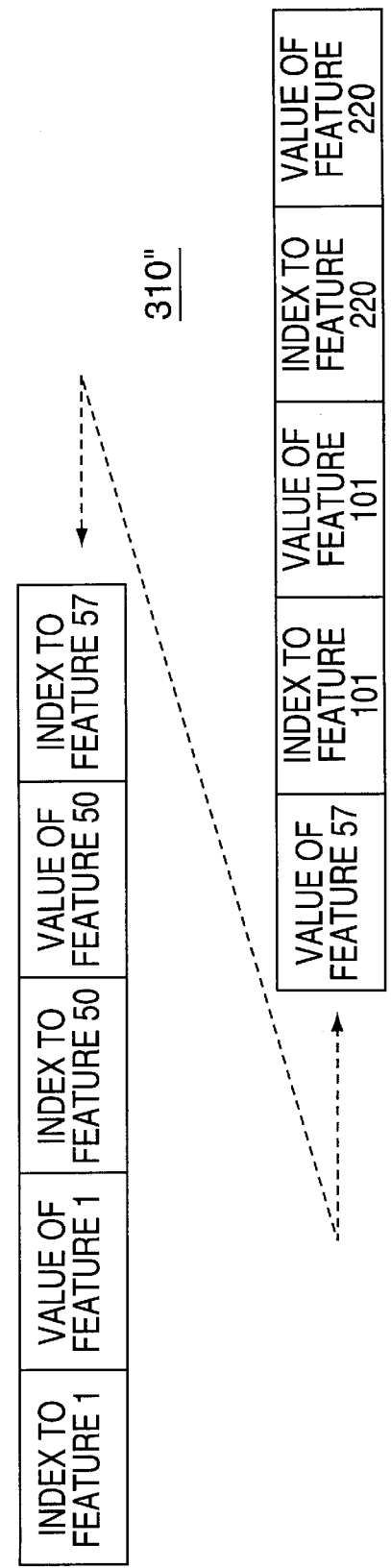

FIG. 4B 410'

| INDEX TO FEATURE 50 | INDEX TO FEATURE 101 | INDEX TO FEATURE 220 |
|---|---|---|
| VALUE OF FEATURE 50 | VALUE OF FEATURE 101 | VALUE OF FEATURE 220 |

| INDEX TO FEATURE 50 | VALUE OF FEATURE 50 | INDEX TO FEATURE 101 | VALUE OF FEATURE 101 | INDEX TO FEATURE 220 | VALUE OF FEATURE 220 |

|  | CATEGORY 960 |  |
|---|---|---|
|  | IN CATEGORY + | NOT IN CATEGORY − |
| HAS FEATURE + | 910 | 920 |
| 950 FEATURE | | |
| DOES NOT HAVE FEATURE − | 930 | 940 |

0.5
PROBABILITY IN CATEGORY

METHODS AND APPARATUS FOR CLASSIFYING TEXT AND FOR BUILDING A TEXT CLASSIFIER

§ 1. BACKGROUND OF THE INVENTION
§ 1.1 Field of the Invention

The present invention concerns determining whether an object, such as a textual information object for example, belongs to a particular category or categories. This determination is made by a classifier, such as a text classifier for example. The present invention also concerns building a (text) classifier by determining appropriate parameters for the (text) classifier.

§ 1.2 Related Art

§ 1.2.1 THE NEED FOR TEXT CLASSIFICATION

To increase their utility and intelligence, machines, such as computers for example, are called upon to classify (or recognize) objects to an ever increasing extent. For example, computers may use optical character recognition to classify handwritten or scanned numbers and letters, pattern recognition to classify an image, such as a face, a fingerprint, a fighter plane, etc., or speech recognition to classify a sound, a voice, etc.

Machines have also been called upon to classify textual information objects, such as a textual computer file or document for example. The applications for text classification are diverse and important. For example, text classification may be used to organize textual information objects into a hierarchy of predetermined classes or categories for example. In this way, finding (or navigating to) textual information objects related to a particular subject matter is simplified. Text classification may be used to route appropriate textual information objects to appropriate people or locations. In this way, an information service can route textual information objects covering diverse subject matters (e.g., business, sports, the stock market, football, a particular company, a particular football team) to people having diverse interests. Text classification may be used to filter textual information objects so that a person is not annoyed by unwanted textual content (such as unwanted and unsolicited e-mail, also referred to as junk e-mail, or "spam"). As can be appreciated from these few examples, there are many exciting and important applications for text classification.

§ 1.2.2 KNOWN TEXT CLASSIFICATION METHODS

In this section, some known classification methods are introduced. Further, acknowledged or suspected limitations of these classification methods are introduced. First, rule-based classification is discussed in § 1.2.2.1 below. Then, classification systems which use both learning elements and performance elements in are discussed in § 1.2.2.2 below.

§ 1.2.2.1 RULE BASED CLASSIFICATION

In some instances, textual content must be classified with absolute certainty, based on certain accepted logic. A rule-based system may be used to effect such types of classification. Basically, rule-based systems use production rules of the form:

IF condition, THEN fact.

The conditions may include whether the textual information includes certain words or phrases, has a certain syntax, or has certain attributes. For example, if the textual content has the word "close", the phrase "nasdaq" and a number, then it is classified as "stock market" text.

Unfortunately, in many instances, rule-based systems become unwieldy, particularly in instances where the number of measured or input values (or features or characteristics) becomes large, logic for combining conditions or rules becomes complex, and/or the number of possible classes becomes large. Since textual information may have many features and complex semantics, these limitations of rule-based systems make them inappropriate for classifying text in all but the simplest applications.

Over the last decade or so, other types of classifiers have been used increasingly. Although these classifiers do not use static, predefined logic, as do rule-based classifiers, they have outperformed rule-based classifiers in many applications. Such classifiers are discussed in § 1.2.2.2 below and typically include a learning element and a performance element. Such classifiers may include neural networks, Bayesian networks, and support vector machines. Although each of these classifiers is known, each is briefly introduced below for the reader's convenience.

§ 1.2.2.2 CLASSIFIERS HAVING LEARNING AND PERFORMANCE ELEMENTS

As just mentioned at the end of the previous section, classifiers having learning and performance elements outperform rule-based classifiers, in many applications. To reiterate, these classifiers may include neural networks (introduced in § 1.2.2.2.1 below for the reader's convenience), Bayesian networks (introduced in § 1.2.2.2.2 below for the reader's convenience), and support vector machines (introduced in § 1.2.2.2.3 below for the reader's convenience).

§ 1.2.2.2.1 NEURAL NETWORKS

A neural network is basically a multilayered, hierarchical arrangement of identical processing elements, also referred to as neurons. Each neuron can have one or more inputs but only one output. Each neuron input is weighted by a coefficient. The output of a neuron is typically a function of the sum of its weighted inputs and a bias value. This function, also referred to as an activation function, is typically a sigmoid function. That is, the activation function may be S-shaped, monotonically increasing and asymptotically approaching fixed values (e.g., +1, 0, -1) as its input(s) respectively approaches positive or negative infinity. The sigmoid function and the individual neural weight and bias values determine the response or "excitability" of the neuron to input signals.

In the hierarchical arrangement of neurons, the output of a neuron in one layer may be distributed as an input to one or more neurons in a next layer. A typical neural network may include an input layer and two (2) distinct layers; namely, an input layer, an intermediate neuron layer, and an output neuron layer. Note that the nodes of the input layer are not neurons. Rather, the nodes of the input layer have only one input and basically provide the input, unprocessed, to the inputs of the next layer. If, for example, the neural network were to be used for recognizing a numerical digit character in a 20 by 15 pixel array, the input layer could have 300 neurons (i.e., one for each pixel of the input) and the output array could have 10 neurons (i.e., one for each of the ten digits).

The use of neural networks generally involves two (2) successive steps. First, the neural network is initialized and trained on known inputs having known output values (or classifications). Once the neural network is trained, it can then be used to classify unknown inputs. The neural network may be initialized by setting the weights and biases of the neurons to random values, typically generated from a Gaussian distribution. The neural network is then trained using a succession of inputs having known outputs (or classes). As the training inputs are fed to the neural network, the values of the neural weights and biases are adjusted (e.g., in accordance with the known back-propagation technique) such that the output of the neural network of each individual training pattern approaches or matches the known output. Basically, a gradient descent in weight space is used to minimize the output error. In this way, learning using successive training inputs converges towards a locally optimal solution for the weights and biases. That is, the weights and biases are adjusted to minimize an error.

In practice, the system is not trained to the point where it converges to an optimal solution. Otherwise, the system would be "over trained" such that it would be too specialized to the training data and might not be good at classifying inputs which differ, in some way, from those in the training set. Thus, at various times during its training, the system is tested on a set of validation data. Training is halted when the system's performance on the validation set no longer improves.

Once training is complete, the neural network can be used to classify unknown inputs in accordance with the weights and biases determined during training. If the neural network can classify the unknown input with confidence, one of the outputs of the neurons in the output layer will be much higher than the others.

To ensure that the weight and bias terms do not diverge, the algorithm uses small steps. Furthermore, the back propagation (gradient descent) technique used to train neural networks is relatively slow. (See, e.g., the article: Schütze, et al., "A Comparison of Classifiers and Document Representations for the Routing Problem", *International ACM SIGIR Conference on Research and Development in Information Retrieval*, Section 5 (1995) (Hereafter referred to as "the Sch ütze article"). Consequently, convergence is slow. Also, the number of neurons in the hidden layer cannot easily be determined a priori. Consequently, multiple time-consuming experiments are often run to determine the optimal number of hidden neurons.

§ 1.2.2.2.2 BAYESIAN NETWORKS

Having introducing neural networks above, Bayesian networks are now briefly introduced. Typically, Bayesian networks use hypotheses as intermediaries between data (e.g., input feature vectors) and predictions (e.g., classifications). The probability of each hypothesis, given the data ("P(hypo|data)"), may be estimated. A prediction is made from the hypotheses using posterior probabilities of the hypotheses to weight the individual predictions of each of the hypotheses. The probability of a prediction X given data D may be expressed as:

$$P(X \mid D) = \sum_i P(X \mid D, H_i) P(H_i \mid D) = \sum_i P(X \mid H_i) P(H_i \mid D)$$

where $H_i$, is the $i^{th}$ hypothesis. A most probable hypothesis $H_i$ that maximizes the probability of $H_i$ given D ($P(H_i|D)$) is referred to as a maximum a posterior hypothesis (or "$H_{MAP}$") and may be expressed as follows:

$$P(X|D) \approx P(X|H_{MAP})$$

Using Bayes' rule, the probability of a hypothesis $H_i$ given data D may be expressed as:

$$P(H_i \mid D) = \frac{P(D \mid H_i) P(H_i)}{P(D)}$$

The probability of the data D remains fixed. Therefore, to find $H_{MAP}$, the numerator must be maximized.

The first term of the numerator represents the probability that the data would have been observed given the hypothesis i. The second term represents the prior probability assigned to the given hypothesis i.

A Bayesian network includes variables and directed edges between the variables, thereby defining a directed acyclic graph (or "DAG"). Each variable can assume any of a finite number of mutually exclusive states. For each variable A, having parent variables $B_1, \ldots B_n$, there is an attached probability table ($P(A|B_1, \ldots B_n)$). The structure of the Bayesian network encodes the assumptions that each variable is conditionally independent of its non-descendants, given its parent variables.

Assuming that the structure of the Bayesian network is known and the variables are observable, only the set of conditional probability tables need be learned. These tables can be estimated directly using statistics from a set of learning examples. If the structure is known but some variables are hidden, learning is analogous to neural network learning discussed above.

An example of a simple Bayesian network is introduced below. A variable "MML" may represent a "moisture of my lawn" and may have states "wet" and "dry". The MML variable may have "rain" and "my sprinkler on" parent variables each having "Yes" and "No" states. Another variable, "MNL" may represent a "moisture of my neighbor's lawn" and may have states "wet" and "dry". The MNL variable may share the "rain" parent variable. In this example, a prediction may be whether my lawn is "wet" or "dry". This prediction may depend of the hypotheses (i) if it rains, my lawn will be wet with probability ($x_1$) and (ii) if my sprinkler was on, my lawn will be wet with probability ($x_2$). The probability that it has rained or that my sprinkler was on may depend on other variables. For example, if my neighbor's lawn is wet and they don't have a sprinkler, it is more likely that it has rained. An example of a Bayesian network associated with the "wet grass" problem is presented in the text: Jensen, *An Introduction to Bayesian Networks*, pp. 22–25, Spinger-Verlag, New York (1997).

As discussed above, the conditional probability tables in Bayesian networks may be trained, as was the case with neural networks. Advantageously, by allowing prior knowledge to be provided for, the learning process may be shortened. Unfortunately, however, prior probabilities for the conditional probabilities are usually unknown, in which case a uniform prior is used.

§ 1.2.2.2.2.3 SUPPORT VECTOR MACHINES

Support vector machines (or "SVMs") are another type of trainable classifier. SVMs are reportedly more accurate at classification than naive Bayesian networks in certain applications, such as text classification for example. (See, e.g., the article, Joachims, "Text Categorization with Support Vector Machines: Learning with Many Relevant Features", LS-8, Report 23, University of Dortmund Computer Science Department (November 1997).) They are also reportedly more accurate than neural networks in certain applications, such as reading handwritten characters for example. (See, e.g., the article, LeCun et al. , "Learning Algorithms for Classification: A Comparison on Handwritten Digit Recognition," *Neural Networks: The Statistical Mechanics Perspective*, Oh et al. (Eds.), pp. 261–276, World Scientific (1995). Unfortunately, however, SVMs reportedly take longer to train than naive Bayesian classifiers. A new method and apparatus to build (or train) SVMs in an efficient manner is disclosed in U.S. patent application Ser. No. 09/055,477, by John Platt, entitled "Methods and Apparatus for Building a Support Vector Classifier", filed on Apr. 6, 1998 and incorporated by reference.

Although SVMs are known to those skilled in the art, their theory and operation will be introduced for the reader's convenience.

An object to be classified may be represented by a number of features. If, for example, the object to be classified is represented by two (2) features, it may be represented by a point in two (2) dimensional space. Similarly, if the object to be classified is represented by n features, also referred to as a "feature vector", it may be represented by a point in n-dimensional space. The simplest form of an SVM defines a plane in the n-dimensional space (also referred to as a hyperplane) which separates feature vector points associated with objects "in a class" and feature vector points associated with objects "not in the class". A number of classes can be defined by defining a number of hyperplanes. The hyperplane defined by a trained SVM maximizes a distance (also referred to as an Euclidean distance) from it to the closest points (also referred to as "support vectors") "in the class" and "not in the class". A hyperplane is sought which maximizes the distances between the support vectors and the hyperplane, so that the SVM defined by the hyperplane is robust to input noise. The hyperplane (or hypersurface) is defined by a training process, some of which are discussed in § 4.2.1.4.1 below.

§ 1.2.2.2.4 CHALLENGES TO USING CLASSIFIERS HAVING LEARNING AND PERFORMANCE ELEMENTS FOR TEXT CLASSIFICATION

Although, as discussed above, rule-based classifiers are feasible in only the simplest text classification applications, some significant challenges exist when using systems having learning and performance ELEMENTS (ALSO REFERRED TO AS "LEARNING MACHINES") FOR text classification. Some of the more significant challenges will be introduced in §§ 1.2.2.2.4.1 through 1.2.2.2.4.3 below.

§ 1.2.2.2.4.1 FEATURE VECTOR SIZE

When training learning machines for text classification, a set of learning examples are used. Each learning example includes a vector of features associated with a textual information object. In some applications, such feature vectors may have on the order of $10^8$ features. A large number of features can easily be generated by considering the presence or absence of a word in a document to be a feature. If all of the words in a corpus are considered as possible features, then there can be millions of unique features. For example, web pages have many unique strings and can generate millions of features. An even larger number of features are possible if pairs or more general combinations of words or phrases are considered, or if the frequency of occurrence of words is considered. The number of features in a feature vector may be reduced by so-called "feature reduction" or "feature selection" methods such that a reduced feature vector, having a subset of the features of the original feature vector, is produced. Indeed, some believe that for learning machine text classifiers to be feasible, feature selection is needed.

Known feature selection techniques include DF-Thresholding (See, e.g., the paper: Yang and Peterson, "A Comparative Study on Feature Selection in Text Categorization," *International Conference on Machine Learning* (1997); hereafter referred to as: the Yang-Peterson article"), Chi-Squared Test (See, e.g., the Schütze article), Term Strength Criterion (See, e.g., the article: Yang and Wilbur, "Using Corpus Statistics to Remove Redundant Words in Text Categorization," *Journal of the American Society for Information Science*, Vol. 47, No. 5, pp. 357–369 (1996); hereafter referred to as "the Yang-Wilbur article"), Information Gain Criteria (See, e.g., the Yang-Peterson article), correlation coefficient which is the square root of the Chi-Squared measure (See, e.g., the article: Ng, et al, "Feature Selection, Perceptron Learning, and a Usability Case Study for Text Categorization", *Proceedings of SIGIR'97*, p.67–73 (1997) and Latent Semantic Indexing (or "LSI") using Singular Value Decomposition (or "SVD") which is a technique that represents features by a low-dimensional linear combination of orthogonal indexing variables (See, e.g., Schütze, et al).

However, some have concluded that feature selection should be avoided. For example, the Joachims article, which espouses the use of SVMs for text classification, concludes that feature selection is likely to hurt performance due to a loss of information. (See, e.g., the Joachims article, page 3.) The Joachims article further concludes that since SVMs can generalize well in high dimensional feature spaces, they eliminate the need for feature selection thereby making text categorization easier. (See, e.g., the Joachims article, page 11.) Thus, while some in the art have found feature selection useful, when SVMs are used for text classification, feature selection has been avoided in some instances.

§ 1.2.2.2.4.2 OVERFITTING

When a learning machine is trained, it is trained based on training examples from a set of feature vectors. In general, performance of a learning machine will depend, to some extent, on the number of training examples used to train it. Even if there are a large number of training examples, there may be a relatively low number of training examples which belong to certain categories.

Many learning machines utilize sigmoid functions (that is, s-shaped, monotonic functions) to determine an output (e.g., a determination as to whether an object is in a category or not) based on an input (e.g., a feature vector of an unknown object). Unfortunately, when there is little training data available for a given category, the parameters of the sigmoid function are not well defined. Consequently, when there is little training data available for a given category, the sigmoid function can be overfit to past data. Such overfitting can lead to unwarranted confidence in the output of the learning machine and should be avoided.

§ 1.2.2.2.4.3 CLASSIFICATION SPEED

Training time and response (e.g., classification) time are two (2) important characteristics of a learning machine. For example, even those that espouse the use of learning machines, and SVMs in particular, for classifying text concede that the training time of SVMs is longer than other methods. This challenge is addressed in the U.S. patent application Ser. No. 09/055,477, by John Platt, entitled "Methods and Apparatus for Building a Support Vector Classified", filed on Apr. 6, 1998 and assigned to a common assignee (incorporated by reference) and will not be addressed in detail here.

There remains the issue of response (or classification) time. The present inventors believe that the SVM classifier discussed in the Joachims paper classifies unknown objects in accordance with the following expression:

$$O = \sum_{i=1}^{nte} \alpha_i (\vec{x}_i \cdot \vec{x}_j) y_i \tag{1}$$

where:
  O=the classification output;
  nte=the number of training examples;
  $\alpha_i$=Lagrange multiplier training example i;
  $x_i$=feature vector of training example i;
  $x_j$=feature vector of unknown object j; and
  $y_i$=known output of training example i.
Using expression (1) to determine an output is relatively slow. Naturally, a faster classifier would be desirable.

The Schütze article discusses logistic regression classifier which employs a weight vector (β) derived using a maximum likelihood and the Newton-Raphson method of numerical optimization. Although it is believed that this classifier is able to classify objects faster than the SVM classifier discussed in the Joachims paper, it is believed that the weight vector (β) determined does not provide the best classification results.

§ 2. SUMMARY OF THE INVENTION

The present invention may perform at least one (1) of two (2) basic functions, namely generating parameters for a classifier, and classifying objects, such as textural information objects.

Basically, parameters are generated for a classifier based on a set of training examples. A set of feature vectors may be generated from a set of training examples. The features of the set of feature vectors may be reduced. The parameters to be generated may include a defined monotonic (e.g., sigmoid) function and a weight vector. The weight vector may be determined by means of SVM training (or by another, known, technique). The monotonic (e.g., sigmoid) function may be defined by means of an optimization method.

The text classifier may include a weight vector and a defined monotonic (e.g., sigmoid) function. Basically, the output of the text classifier of the present invention may be expressed as:

$$O_c = \frac{1}{1 + e^{A(\vec{w}_i \cdot \vec{x}) + B}} \quad (2)$$

where:

$O_c$=a classification output for category c;

$w_c$=a weight vector parameter associated with category c;

x=is a (reduced) feature vector based on the unknown textual information object; and A and B are adjustable parameters of a monotonic (e.g., sigmoid) function.

The calculation of the output from expression (2) is quicker than the calculation of the output from expression (1).

Depending on the form of the object to be classified, the classifier may (i) convert a textual information object to a feature vector, and (ii) reduce the feature vector to a reduced feature vector having less elements.

§ 3. BRIEF DESCRIPTION OF THE DRAWINGS

§ 4. DETAILED DESCRIPTION

Figure 1:
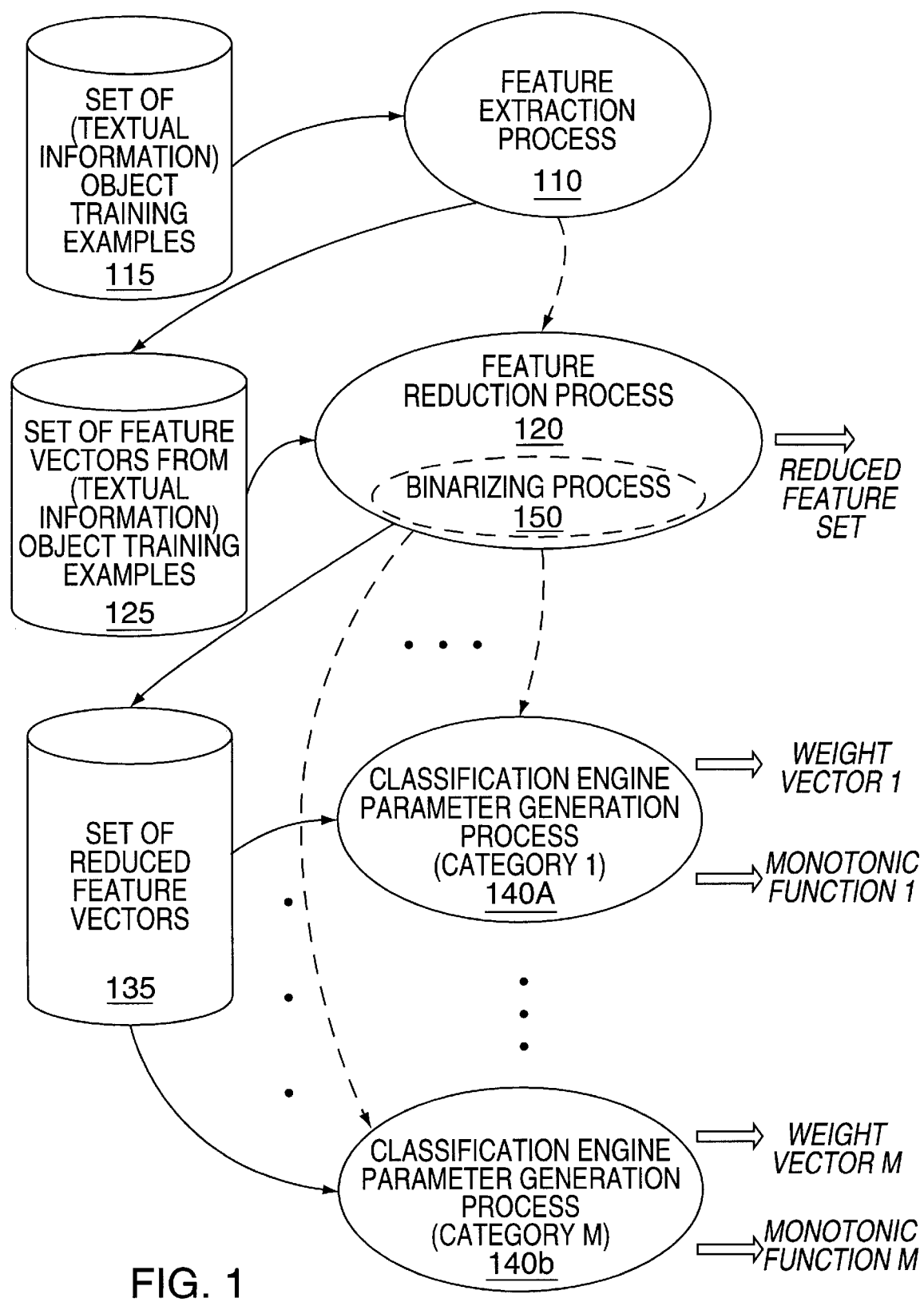
FIG. 1 is a high level diagram of processes that may be performed by a first aspect of the present invention.

The present invention concerns a novel classifier, such as a text classifier, and building such a (text) classifier. The following description is presented to enable one skilled in the art to make and use the invention, and is provided in the context of particular applications and their requirements. Various modifications to the disclosed embodiments will be apparent to those skilled in the art, and the general principles set forth below may be applied to other embodiments and applications. Thus, the present invention is not intended to be limited to the embodiments shown.

Regarding notation used in the specification, a vector may be depicted with an arrow "hat" or by bold typeface.

Functions which may be performed by the present invention are described in § 4.1 below. Then exemplary methodologies, and structures for carrying out the methodologies, are described in § 4.2 below.

§ 4.1 FUNCTIONS

The present invention may perform at least one (1) of two (2) basic functions. The first basic function, namely generating parameters for a classifier, is discussed in § 4.1.1 below. The second basic function, namely classifying text, is discussed in § 4.1.2 below.

§ 4.1.1 GENERATING PARAMETERS FOR A CLASSIFIER

Basically, parameters are generated for a classifier based on a set of training examples. The present invention may function to generate a set of feature vectors from the set of training examples. The present invention may also function to reduce the number of features of feature vectors of the set. The parameters to be generated include a defined monotonic (e.g., sigmoid) function and a weight vector. The weight vector may be determined by means of SVM training. The monotonic (e.g., sigmoid) function may be defined by means of an optimization method. The optimization method may use a special target function to avoid overfitting.

§ 4.1.2 CLASSIFYING TEXT

The present invention may classify text. A text classifier may include a weight vector and a defined monotonic (e.g., sigmoid) function. Basically, the output of the text classifier may be expressed as:

$$O_c = \frac{1}{1 + e^{A(\vec{w}_c \cdot \vec{x}) + B}} \quad (2)$$

where:

$O_c$=a classification output for category c;

$w_c$=a weight vector parameter associated with category c;

x=is a (reduced) feature vector based on the unknown textual information object; and A and B are adjustable parameters of a monotonic (e.g., sigmoid) function.

To reiterate, the calculation of the output from expression (2) is quicker than the calculation of the output from expression (1).

Depending on the form of the object to be classified, the classifier may (i) convert a textual information object to a feature vector, and (ii) reduce the feature vector to a reduced feature vector having less elements.

§ 4.2 EXEMPLARY STRUCTURE/METHODOLOGY

Exemplary processes and methods for generating parameters of a classifier are described in § 4.2.1 below. Exemplary processes and methods for classifying text are described in § 4.2.2 below. Finally, exemplary apparatus (or architecture) for effecting the described processes and methods are described in § 4.2.3 below.

§ 4.2.1 PROCESSES/METHODS FOR GENERATING PARAMETERS OF A CLASSIFIER

FIG. 1 is a diagram which depicts processes and data which may be used by the present invention to generate parameters of a text classifier. Assuming that a set of training data 115 (e.g., textual information objects and category labels) is provided, a feature extraction process (or more generally, a feature extractor) 110 generates a feature vector corresponding to each of the textual information objects of the training set. The feature vectors may be stored at storage location 125. An exemplary feature extraction process is discussed in § 4.2.1.1 below.

Figure 3A:
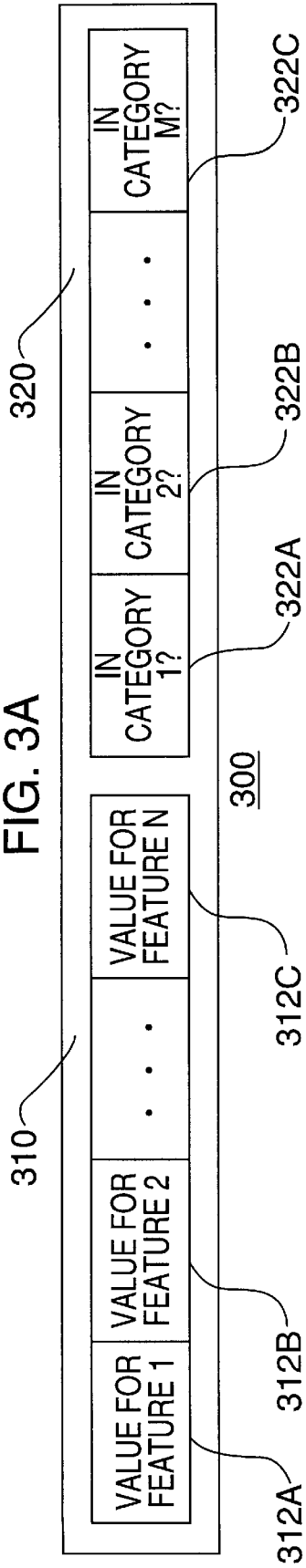
FIG. 3 is an exemplary data structure of a training example of a textual information object.
FIGS. 3B and 3C are alternative exemplary sparse vector data structures of the textual information object.

FIG. 3 illustrates an exemplary data structure 300 of a training object which includes a feature vector 310 and a category vector 320. The feature vector 310 includes fields 312 corresponding to features (or attributes) which were derived from a textual information object. In this example, there are "n" features in the feature vector 310. The feature (or attribute) fields 312 of the feature vector 310 include corresponding values derived from the textual information object. For example, if it is assumed that the textual object may include words from a 2.5 million word vocabulary, then the feature vector 310 may include 2.5 million fields, each corresponding to a word of the vocabulary. The value stored in a field may correspond to the number of times a particular word of the vocabulary appears in the textual information object.

Since most values in a feature vector of a textual information object are zero (0), sparse vector techniques may be used such that the feature vector is represented by two (2) smaller arrays rather than one large array. A first array indexes features having non-zero values. A second array includes the values of the features indexed by the first array. For example, referring to FIG. 3B, if only the first, $50^{th}$, $57^{th}$, $101^{st}$, and $220^{th}$ features of a feature vector have non-zero values, a sparse data structure 310' may be used instead of the feature vector 310 of FIG. 3. The sparse data structure 310' includes a first array 350 which includes the indices (e.g., 1, 50, 57, 101, and 220) to the non-zero features, and a second array 360 which includes the values of the indexed features. FIG. 3C depicts another sparse data structure 310" which has alternating indexing fields and value fields corresponding to the non-zero features.

The category vector 320 includes fields 322 corresponding to "m" different categories. The fields 322 of the category vector 310 may include a binary value which indicates whether or not the textual information object belongs to a particular category. A textual information object may belong to more than one category.

Figure 4A:
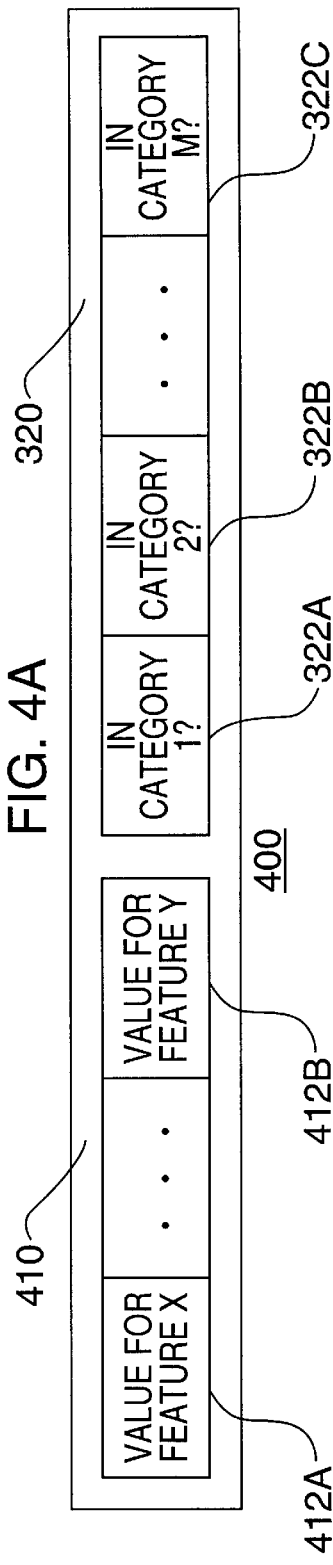
FIG. 4 is an exemplary data structure of the training example of FIG. 3, in which a feature vector has been reduced.
FIGS. 4B and 4C are alternative exemplary sparse vector data structures of the reduced feature vector.

The data structures 300 corresponding to each textual information object of the training set may be stored at storage area 125. A feature reduction process (or more generally, a feature reduction facility) 120 accepts the data structures 300, either from the storage area 125 or the feature extraction process 110, and reduces the number of features of the feature vector 310 from "n" to "z", where "z" is less than "n", and may be as much as three (3) orders of magnitude less than "n". Referring to FIG. 4, a new data structure 400 is generated by the feature reduction process 120. The data structure 400 includes a category vector 320 which corresponds to that of the data structure 300. The data structure 400 also includes a reduced feature vector 410 having fields 412 corresponding to features (or attributes) of the textual information objects of the training set that are determined to be relatively important features by the feature reduction process 120. The feature reduction process 120 also produces a reduced feature set which defines which "z" of the "n" fields 412 of the feature vector are considered to be relatively important. An exemplary feature reduction process 120 is discussed in § 4.2.1.2 below.

Although each textual information object was described as being a single, relatively large, feature vector array, in practice, sparse array techniques are used such that each textual information object may be represented by two (2) smaller arrays, rather than one (1) large array, as discussed above. Referring for example to FIG. 4B, if the first and $57^{th}$ features are not considered important, a sparse data structure 410' results. The sparse data structure 410' includes an first array 450 which includes the indices (e.g., 50, 101, and 220) of non-zero, selected, features, and a second array 460 which includes the values of the features indexed by the first array 450. FIG. 4D depicts another sparse data structure 410" which has alternating indexing fields and value fields corresponding to the non-zero, selected, features.

Figure 5A:
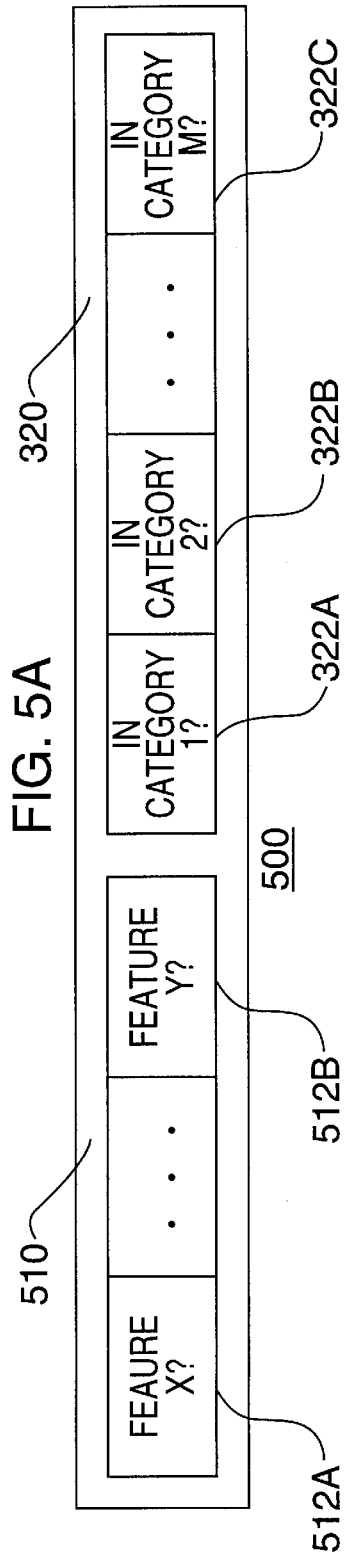
FIG. 5 is an exemplary data structure of the training example of FIG. 4, in which values of a reduced feature vector have been binarized.
FIGS. 5B and 5C are alternative exemplary sparse vector data structures of the binarized reduced feature vector.

An optional (depicted in dashed lines) binarizing process 150 may be used to convert each value of each field 412 of the reduced feature vector 412 of each of the objects of the training set, to a binary value. This conversion of values to binary values may take place by applying the values to a predetermined (or derived) threshold, in the case of each field 412. Thus, a different threshold may be associated with each field 412. Naturally, a single threshold could be applied to all fields 412. FIG. 5 illustrates a data structure which may be used to represent the resulting reduced feature vector containing binary values 510. The vector 510 has the same number of fields "z" as the vector 410 of the data structure 400 of FIG. 4. However, in this case, each of the fields 512 include a binary value (e.g., represented by one (1) bit) rather than a more general value. The category vector 320 of the data structure 500 is the same as that of the data structures 300 and 400. An exemplary binarizing process is discussed in § 4.2.1.3 below.

Figure 5B:
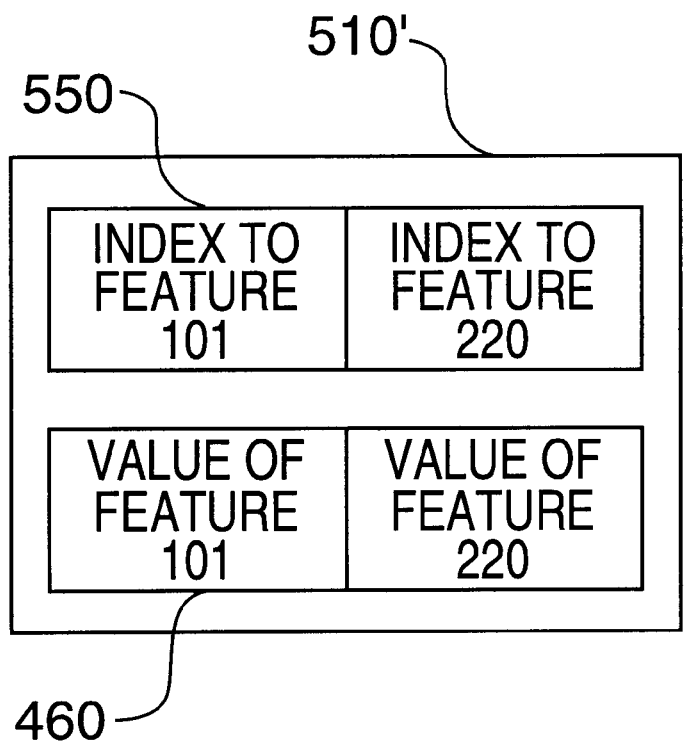
Figure 5C:
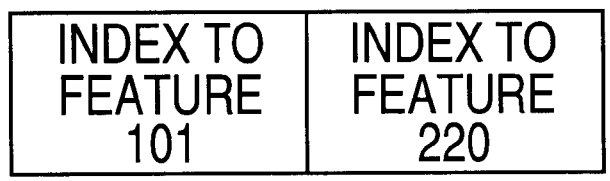

Referring to FIG. 5B, if the selected, non-zero, features 101 and 220 pass their threshold(s) but the selected, non-zero, feature 50 does not pass its threshold, a sparse data structure 510' includes a first array 550 which includes the indices (e.g., 101 and 220) of the selected, non-zero, threshold passing features, and a second array 560 which includes the values of the indexed features. As shown in FIG. 5C, since the values of the binarized, selected, non-zero, threshold passing features will all be "1", an alternative sparse data structure 510" including only the index array 550 may be used.

Naturally other quantizers can be used to provide q-ary (where q>2) quantization instead of binary quantization.

The reduced feature vector (or binarized reduced feature vector) may be stored at storage unit 135.

A general text classifier will include classifiers for each of the "m" different categories. Recall that a weight vector parameter and a monotonic (e.g., sigmoid) function, having adjustable parameters A and B, are to be determined for each of the "m" classifiers. Accordingly, "m" processes 140 (which may include a support vector machine training facility and a function generator) accept the reduced feature vector (or binarized reduced feature vector) from storage unit 135 or from the feature reduction process 120 (or binarizing process 150). Although "m" parallel processes 140 are depicted in FIG. 1, a single process 140 could be used to process "m" successive categories (or p processes could be run m/p times). In any event, a weight vector parameter and a monotonic (e.g., sigmoid) function are generated for each of the "m" categories. An exemplary process for generating parameters of a text classifier is described in § 4.2.1.4 below.

§ 4.2.1.1 FEATURE EXTRACTION

Recall from FIG. 1 that a feature extraction process 110 generates a set of feature vectors (e.g., stored in data structures 300) from a set of training textual information objects.

Figure 6:
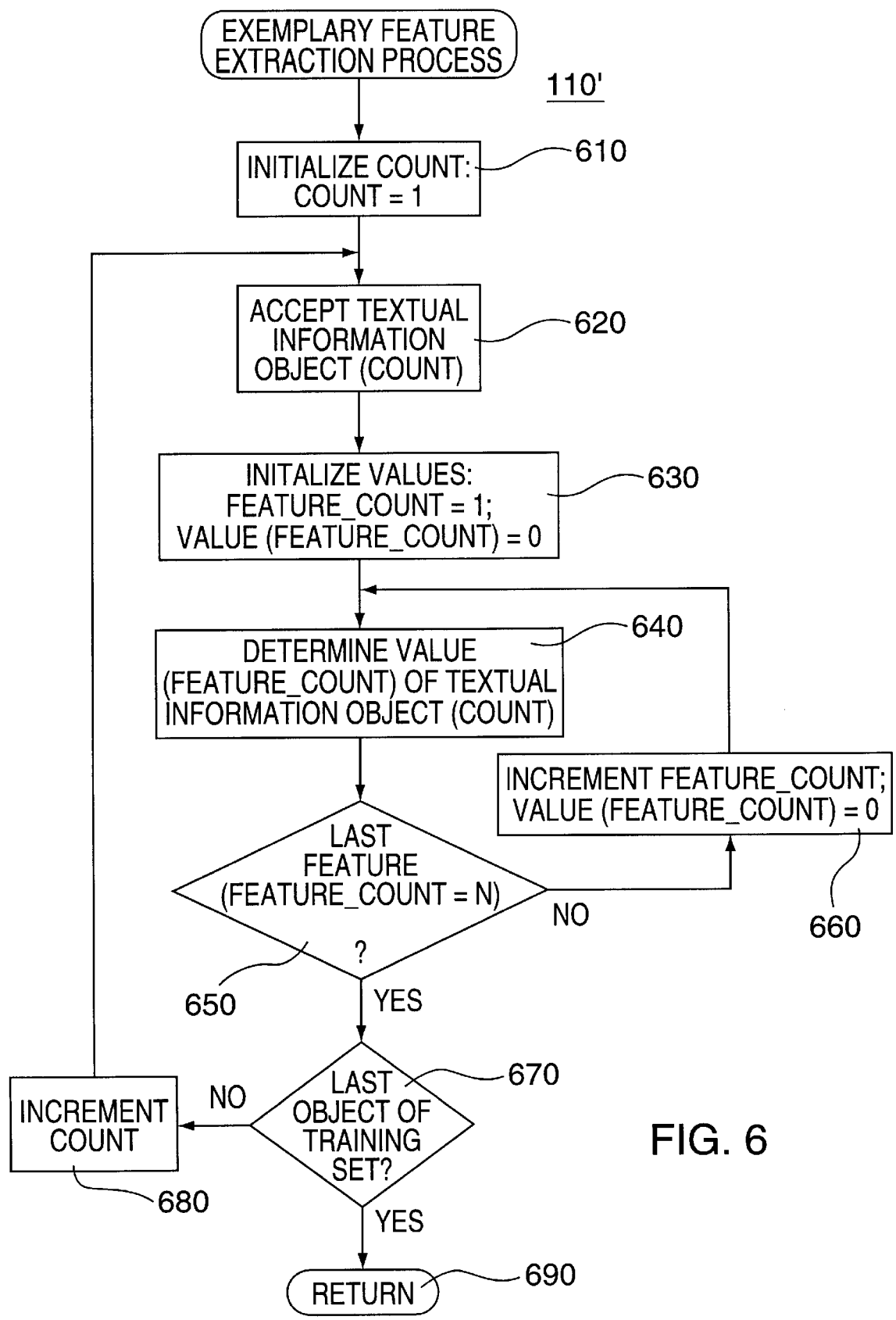
FIG. 6 is a flow diagram of an exemplary feature extraction process.

FIG. 6 is a flow diagram of an exemplary feature extraction process 110'. In step 610, a COUNT value, to be used as an index to textual information objects, is initialized by setting it to 1. Next, a textual information object, as indexed by the COUNT value, is accepted as shown in step 620. As shown in step 630 a FEATURE_COUNT value is initialized to 1 and a VALUE value, as indexed by the FEATURE_COUNT value, is initialized to 0. Next, as shown in step 640 the VALUE value, as indexed by the FEATURE_COUNT value, of the textual information object, as indexed by the COUNT value, is determined. For example, if the 5$^{th}$ feature is the word "sports", and the word "sports" appears three (3) times in the first textual information object, then the VALUE (5) of OBJECT (1) is three (3). As shown in steps 650 and 660, the values for each feature of a given object are determined. As shown in steps 670 and 680, once the values of the features of one object have been determined, the values of the features of the next object are then determined. When the values of all of the features of all of the objects have been determined, the process 110' terminates via return node 690.

To reiterate, step 640 determines a value of a feature of a textual information object. This determination may be performed as follows. A text analyzer may be used to parse each textual information object into constituent tokens. A token is any textual component, such as a word, letter, internal punctuation mark or the like, that is separated from another such component by a blank (white) space or leading (following) punctuation marks. Syntactic phrases and normalized representations for times and dates are also extracted by the text analysis module. Domain-specific features may also be defined and extracted as appropriate. Each of the features may define a word, phrase or letter grouping. Thus, a feature vector is associated with each of the textual information objects.

If a sparse data structure having an index array and a value array (see, e.g., FIG. 3B) or having an array with alternating index fields and value fields (see, e.g., FIG. 3c) is used, in step 640, if VALUE (FEATURE_COUNT) is non-zero, then (i) the next element of the index array (or next index field) is set to FEATURE_COUNT, and (ii) the next element of the value array (or next value field) is set to VALUE (FEATURE_COUNT).

§ 4.2.1.2 FEATURE REDUCTION (HIGH LEVEL)

Figure 7:
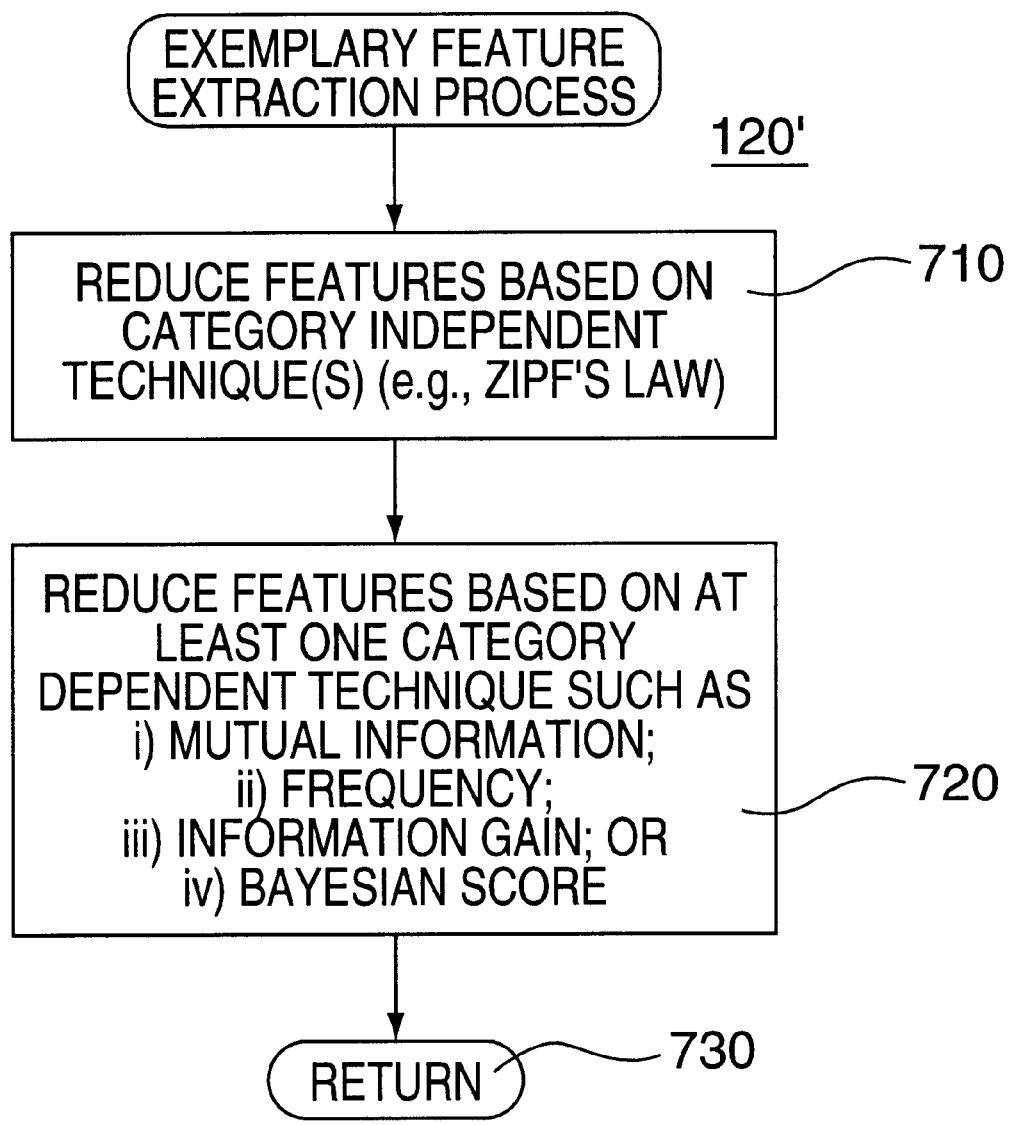
FIG. 7 is a flow diagram of an exemplary feature reduction process.

As discussed above, a feature vector, associated with a textual information object, may contain millions of feature elements. To make training the textual classifier more feasible, the feature vector may be reduced to fewer elements. FIG. 7 is a high level flow diagram of an exemplary feature reduction process 120' ("feature reduction" may also be referred to as "feature selection") which may be used in the present invention. First, as shown in step 710, the present invention may use a category independent feature reduction step (such as ZIPF or frequency) (known but discussed in § 4.2.1.2.1 below for the reader's convenience). Then, as shown in step 720, a category dependent feature reduction technique (some of which are discussed in § 4.2.1.2.2 below) may be performed. The process 120' then terminates via return node 730.

§ 4.2.1.2.1 CATEGORY INDEPENDENT FEATURE REDUCTION

A matrix of feature vectors of a number of training example textual information objects may be reduced by applying collection-wide frequency statistics. Zipf's Law, which is known in the art, concerns the distribution of different words in text and basically states that, the product of a word's rank (r) and frequency (f) is a constant (C) i.e., (r*f=C), as is the product of frequency and number of occurrences (N) (f*N=C). That is, many words will occur only once in a collection; half that number will occur twice; a third that number will occur three times, and so on. It is assumed that words occurring only a small number of times will not be very helpful in classifying new items, and they are thus often omitted. At the other end of the spectrum, words occurring very often are not likely to provide good discrimination among categories and are sometimes omitted. By applying Zipf frequency thresholds, a reduced feature vector results for each of the textual information object training examples. The document-frequency thresholding proposed by the Yang-Pedersen article is similar to our Zipf selection. However, the method discussed in the Yang-Pedersen article uses different selection criteria, keeping only the most frequent terms.

§ 4.2.1.2.2 CATEGORY DEPENDENT FEATURE REDUCTION

After the feature vectors of the textual information objects of the training examples are reduced based on a category independent feature reduction technique, such as Zipf's law for example, they may be further reduced by a category dependent feature reduction technique. Such category dependent feature reduction may use known techniques such as the mutual information technique discussed in § 4.2.1.2.2.1 below, or the information gain technique discussed in § 4.2.1.2.2.2 below. Other known category dependent feature reduction techniques, such as chi-square, correlation coefficient, and SVD (all known and not discussed here) may be used instead. Category dependent feature reduction may also be carried out in accordance with a proprietary technique such as the Bayesian score technique discussed in § 4.2.1.2.2.3 below.

§ 4.2.1.2.2.1 MUTUAL INFORMATION

Figures 9, 10:
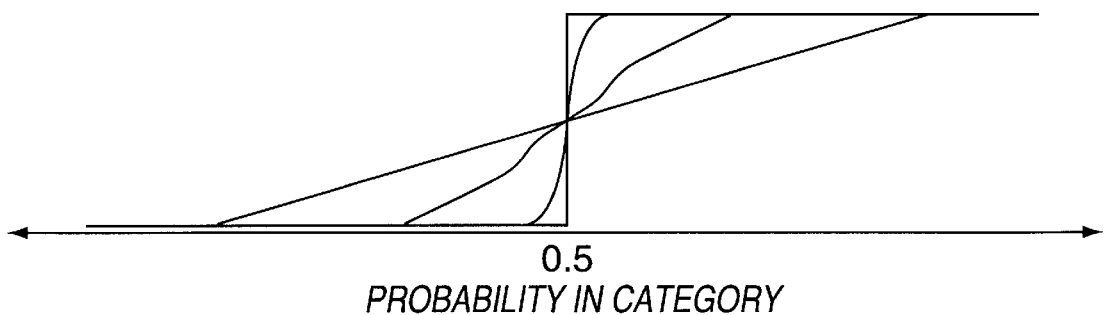
FIG. 9 depicts information used by some feature reduction techniques.
FIG. 10 depicts various sigmoid functions.

Mutual information is a measure of the extent to which a feature is associated with a class, in this instance to a text category. Features that exhibit high mutual information measures are good discriminators of the class, and are therefore chosen. In an exemplary embodiment, the features may be words and the classes may be categories. In such a case, the mutual information "MI" for a given feature ($f_i$), such as a word for example, in a given category $c_i$ can be expressed as:

$$MI = P(f^+c^+)\log\left(\frac{P(f^+c^+)}{P(f^+)P(c^+)}\right) + \quad (3)$$
$$P(f^+c^-)\log\left(\frac{P(f^+c^-)}{P(f^+)P(c^-)}\right) +$$
$$P(f^-c^+)\log\left(\frac{P(f^-c^+)}{P(f^-)P(c^+)}\right) +$$
$$P(f^-c^-)\log\left(\frac{P(f^-c^-)}{P(f^-)P(c^-)}\right)$$

where $P(f^+c^+)$ is the probability that a document has feature f and belongs to category c;

$P(f^-c^+)$ is the probability that a document does not have feature f, but belongs to category c;

$P(f^+c^-)$ is the probability that a document has feature f but does not belong to category c; and $P(f^-c^-)$ is the probability that a document does not have feature f and does not belong to category c;

FIG. 9 depicts a two-way contingency table 900 of a feature "f" 950 and a category "c" 960. Each textual information object exhibits one (1) of the following four (4) characteristics: (i) has the feature "f" 950 and belongs to the category "c" 960 ($f^+c^+$ 910); (ii) has the feature "f" 950 but does not belong to the category "c" 960 ($f^+c^-$ 920); (iii) does not have the feature "f" 950 but belongs to the category "c" 960 ($f^-c^+$ 930); or (iv) does not have the feature "f" 950 and does not belong to the category "c" 960 ($f^-c^-$ 940). If A is a number of textual information objects exhibiting characteristic $f^+c^+$ 910, B is a number of textual information objects exhibiting characteristic $f^+c^-$ 920, C is a number of textual information objects exhibiting characteristic $f^-c^+$ 930, D is a number of textual information objects exhibiting characteristic $f^-c^-$ 940, and N is a total number of textual information objects, then mutual information (MI) may be expressed as:

$$MI = \frac{A}{N}\log\left(\frac{AN}{(A+C)(A+B)}\right) + \frac{B}{N}\log\left(\frac{BN}{(A+B)(B+D)}\right) + \quad (4)$$
$$\frac{C}{N}\log\left(\frac{CN}{(A+C)(C+D)}\right) + \frac{D}{N}\log\left(\frac{DN}{(B+D)(C+D)}\right)$$

Features (e.g., words) can be reduced to those features (words) for which the mutual information is the highest.

Given a training corpus, mutual information is computed for each unique term. Those terms whose mutual information value is less than some predetermined threshold may be removed from the feature vector. Alternatively, if the number of features is to be reduced to a predetermined number "x", then the features with the x highest mutual information values are kept while other features are not considered.

§ 4.2.1.2.2.2 INFORMATION GAIN

Information gain is a term selection criterion which measures the number of bits of information obtained for category prediction by knowing the presence or absence of a term in a document. For the case of a binary classification task (i.e., in category ($c^+$) vs. not in category ($c^-$)) and binary feature values (i.e., feature present ($f^+$) vs. feature absent ($f^-$)), the information gain (G(f)) of a feature (f) is defined as:

$$G(f) = -\sum_{i \in \{+,-\}} P(c^i)\log_2 P(c^i) +$$

-continued
$$P(f^+) \sum_{i \in \{+,-\}} P(f^+c^i)\log_2 P(f^+c^i) +$$
$$P(f^-) \sum_{i \in \{+,-\}} P(f^-c^i)\log_2 P(f^-c^i)$$

where:

$P(c^+)$ is the probability that a document belongs to category c;

$P(c^-)$ is the probability that a document does not belong to category c;

$P(f^+)$ is the probability that a document contains feature f;

$P(f^-)$ is the probability that a document does not contain feature f;

$P(f^+c^i)$ is the probability that a document has feature f and belongs to category $c^i$—for binary classification i takes on values + and −;

$P(f^-c^i)$ is the probability that a document does not have feature f and belongs to category $c^i$—for binary classification i takes on values + and −;

This measure can be generalized to m-ary classification by summing over m possible categories.

Given a training corpus, information gain is computed for each unique feature. Those features whose information gain value is less than some predetermined threshold may be removed from the feature vector. Alternatively, if the number of features is to be reduced to a predetermined number "x", then the features with the x highest information gain values are kept while other features are not considered.

§ 4.2.1.2.2.3 BAYESIAN SCORE

The feature vector may be reduced based on a Bayesian Score (BS). The determination of a Bayesian Score is described in patent application Ser. No. 08/240,019, entitled "Method for Improving Belief Networks" (incorporated herein by reference). The Bayesian Score (BS) of the $i^{th}$ feature f may be defined as:

$$BS_{f_i} = \lg \Gamma(A+1) + \lg \Gamma(B+1) + \lg \Gamma(C+1) + \lg \Gamma(D+1) - \lg \Gamma(A+B+2) - \lg \Gamma(C+D+2) - \lg \Gamma(A+C+2) - \lg \Gamma(B+D+2) + \lg \Gamma(N+4) \quad (6)$$

where $\Gamma(n) = n\Gamma(n-1)$, for all n>0;

$\Gamma(1) = 1$;

$\Gamma(n+1) = n!$, for n=0,1,2, . . . ;

A is a number of textual information objects exhibiting characteristic $f^+c^+$ 910, B is a number of textual information objects exhibiting characteristic $f^+c^-$ 920, C is a number of textual information objects exhibiting characteristic $f^-c^+$ 930, D is a number of textual information objects exhibiting characteristic $f^-c^-$ 940, and N is a total number of textual information objects If the number of features is to be reduced to a predetermined number "x", then the features with the x highest Bayesian Scores are kept while the other features are not considered. A Bayesian Score threshold may also be used to reduce the number of features.

§ 4.2.1.3 BINARIZING THE REDUCED FEATURE VECTOR

The values held in a reduced feature vector may be applied to one threshold, or to thresholds corresponding to the features, to binarize the values of the reduced feature vector. Alternatively, the values in the feature vector may be applied directly to the classifier, or may be encoded as q-ary (where q>2) code through quantization, as is well known in the neural network art.

§ 4.2.1.4 CLASSIFICATION PARAMETER GERERATION

The foregoing steps (i.e., feature extraction, feature reduction, and binarization) may be thought of as pre-processing steps to permit parameters of a text classifier, such as an SVM text classifier, to be more easily determined. Basically, the classifier will classify a textual information object having a reduced feature vector x, based on the following:

$$\text{Classification} = f(\vec{w} \cdot \vec{x})$$

where f(z) a monotonic (e.g., sigmoid) function of z; and w is a weight vector.

Figure 8:
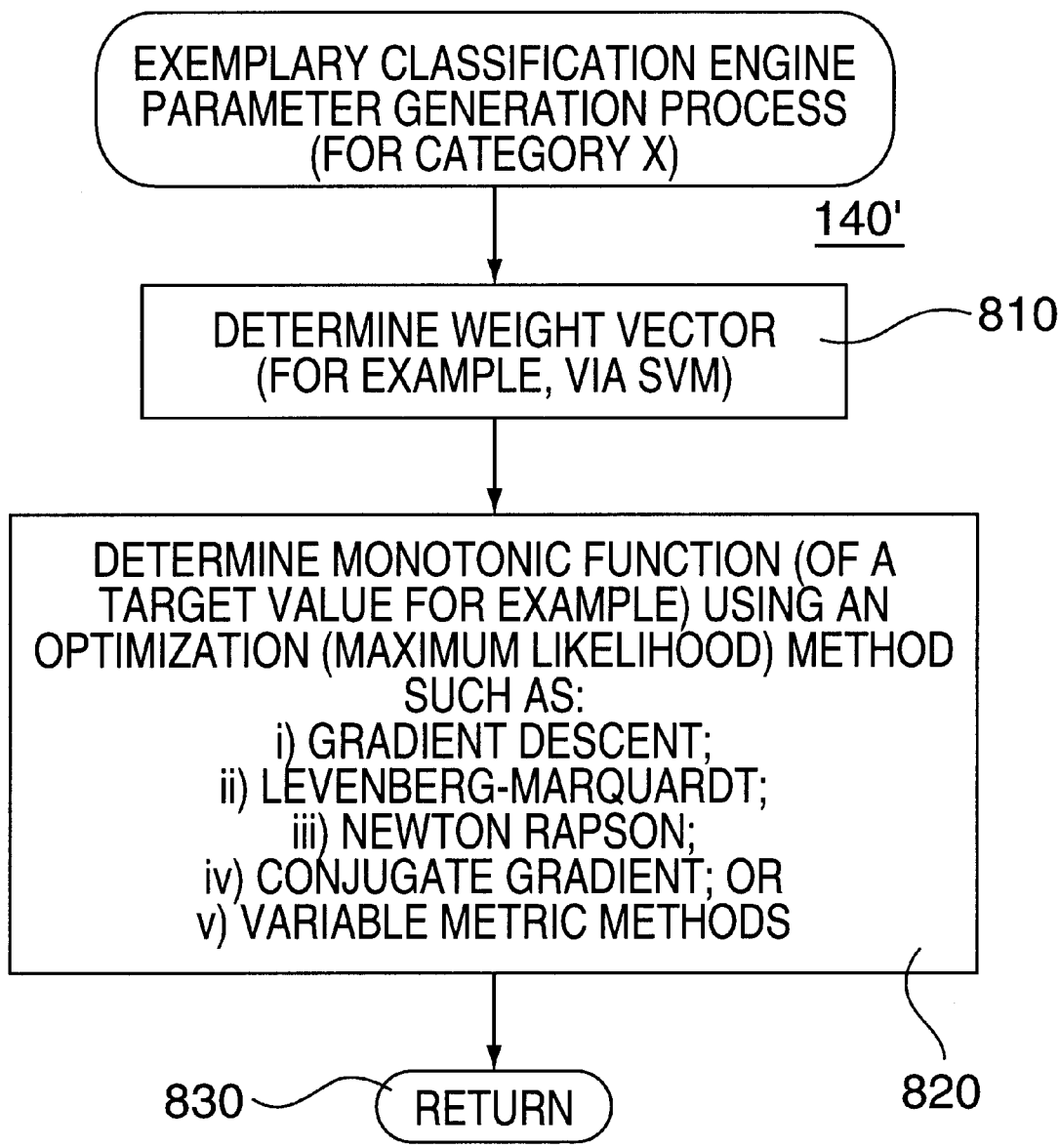
FIG. 8 is a flow diagram of an exemplary processes for generating parameters for a classification engine.

Thus, the classifier has a weight vector parameter, the determination of which is described in § 4.2.1.4.1 below, and a monotonic function having adjustable parameters, the determination of which is described in § 4.2.1.4.2 below. Thus, referring to the flow diagram of an exemplary process 140' for generating parameters for a classification engine depicted in FIG. 8, the weight vector w is determined, as shown in step 810, and the monotonic function (and its adjustable parameters) is determined, as shown in step 820. The process 140' is terminated via return node 830.

§ 4.2.1.4.1 WEIGHT VECTOR DETERMINATION

The classifier of each category has a weight vector parameter. For each category, the weight vector parameter may be generated by methods used to train a support vector machine. As discussed above, and as is known in the art, support vector machines (or "SVMs") may be trained with known objects having known classifications to define a hyperplane, or hypersurface, which separates points in n-dimensional feature vector space which are in the category and not in the category. A pair of adjustable parameters, w (a "weight vector") and b (a "threshold") can be defined such that all of the training data x, having a known classification y, satisfy the following constraints:

$$\vec{x}_i \cdot \vec{w} + b \geq +1 \text{ for } y_i = +1 \quad (7)$$

$$\vec{x}_i \cdot \vec{w} + b \leq -1 \text{ for } y_i = -1 \quad (8)$$

where:

i=1, . . . , number of training examples;

$x_i$ is the $i^{th}$ input vector;

w is a weight vector parameter;

b is a threshold parameter; and $y_i$ is a known classification associated with the $i^{th}$ training example and is +1 if the example is "in the class" and −1 if the training example is "not in the class".

The inequality conditions of equations (7) and (8) can be combined into the following inequality condition by multiplying each side of the equations by y and +1 or −1, and subtracting 1 from both sides:

$$y_i(\vec{x}_i \cdot \vec{w} + b) - 1 \geq 0 \quad (9)$$

The points for which the equality portion of equation (7) hold lie on the hyperplane $x_i$ dot w+b=1, with normal w, and perpendicular distance to the origin (1−b)/‖w‖, where ‖w‖ is the Euclidean norm of the vector w. Similarly, the points for which the equality portion of equation (8) hold lie on the hyperplane $x_i$ dot w+b=−1, with perpendicular distance to the origin (−1−b)/‖w‖. Hence, the margin is the sum of both of the distances, namely 2/‖w‖. By minimizing ‖w‖², subject to the constraints of equation (9), the hyperplane providing the maximum margin can therefore be determined.

Thus, training an SVM presents a constrained optimization (e.g., minimization) problem. That is, a function is minimized (referred to as "the objective function") subject to one or more constraints. Although those skilled in the art are familiar with methods for solving constrained optimization problems (see, e.g., the text, Fletcher, *Practical Methods of Optimization*, $2^{nd}$ ed., pp. 195–224, John Wiley & Sons (1987)), relevant methods will be introduced below for the reader's convenience.

A point that satisfies all constraints is referred to as a "feasible point" and is located in a "feasible region". A constrained optimization (e.g., minimization) problem is solved by a feasible point having no feasible descent directions. Thus, methods for solving constrained minimization problems are often iterative so that a sequence of values converges to a local minimum.

Those skilled in the art recognize that Lagrange multipliers provide a way to transform equality-constrained optimization problems into unconstrained extremization problems. Lagrange multipliers (α) may be used to find an extreme value of a function f(x) subject to a constraint g(x), such that $0 = \nabla f(x) + \alpha \nabla g(x)$, where $\nabla$ is a gradient function. Thus, if $f(w) = \|w\|^2$ and $g(w) = y_i (x_i \text{ dot } w+b) - 1$, then the Lagrangian:

$$L_p = \frac{1}{2}\|\vec{w}\|^2 - \sum_{i=1}^{nte} \alpha_i y_i (\vec{x}_i \cdot \vec{w} + b) + \sum_{i=1}^{nte} \alpha_i \quad (10)$$

where

"nte" is the number of training examples, results.

As is known from mathematical programming literature, the concept of "duality" allows the provision of an alternative formulation of a mathematical programming problem which is, for example, computationally convenient. Minimizing equation (10) subject to the constraint that "alpha" must be non-negative is referred to as a "primal" (or original) problem. The "dual" (i.e., the transformed) problem maximizes equation (10) subject to the constraints that the gradient of $L_p$ with respect to w and b vanishes and that the "alpha" must be non-negative. This transformation is known as the "Wolfe dual". The dual constraints can be expressed as:

$$\vec{w} = \sum_i \alpha_i y_i \vec{x}_i \quad (11)$$

$$\sum_i \alpha_i y_i = 0 \quad (12)$$

Substituting the conditions of equations (11) and (12) into equation (10) yields the following Lagrangian:

$$L_D = \sum_{i=1}^{nte} \alpha_i - \frac{1}{2}\sum_{i,j=1}^{nte} \alpha_i \alpha_j y_i y_j \vec{x}_i \cdot \vec{x}_j \quad (13)$$

The solution to the dual quadratic programming problem can be determined by maximizing the Lagrangian dual problem $L_D$.

The support vector machine can therefore be trained by solving the dual Lagrangian quadratic programming problem. There is a Lagrange multiplier $\alpha_i$ for each example i of a training set. The points for which $\alpha_i$ is greater than zero are the "support vectors". These support vectors are the critical elements of the training set since they lie closest to the decision boundary and therefore define the margin from the decision boundary.

Unfortunately, the quadratic programming problem of equation (13) merely represents the optimization problem with constraints in a more manageable form than the problems of equations (7) and (8). Numerical methods, such as constrained conjugate gradient ascent, projection methods, Bunch-Kaufman decomposition, and interior points methods, may be used to solve the quadratic problem. Suffice to say that these numerical methods are not trivial, particularly when there are a large number of examples i in the training set. Referring to equation (13), solving the quadratic problem involves an "nte" by "nte" matrix (where "nte" is the number of examples in the training set).

The quadratic programming problem may also be solved with a chunking algorithm. Vladimir Vapnik, who is credited with developing SVMs, introduced an iterative training method referred to as "chunking". Though the "chunking" method of training SVMs is understood by those skilled in the art, it will be introduced here for the reader's convenience. At each step, a subproblem consisting of a union of non-zero Lagrange multipliers from a previous step and a number of worst training examples that violate Kuhn-Tucker conditions is solved. These steps are repeated until all examples fulfill the Kuhn-Tucker conditions. In this way, instead of operating on a matrix the size of the square of the number of training examples, the matrix at each step is now on the order of the number of non-zero Lagrange multipliers, squared. Since the matrices are smaller, the algorithm can be faster. Although chunking makes training SVMs tractable, it is still too slow for some applications. For example, the number of non-zero Lagrange multipliers can still grow into the thousands in certain applications. The quadratic problem is still solved with a numerical quadratic programming technique and each iteration is time consuming.

A reportedly better training algorithm for SVMs was introduced in the paper, E. Osuna et al., "An Improved Training Algorithm for Support Vector Machines, "Proceedings of IEEE NNSP'97 (September 1997) (hereafter referred to as "the Osuna method"). The Osuna method stores a fixed size matrix, rather than a matrix that grows with the number of non-zero Lagrange multipliers. A fixed number of Lagrange multipliers are optimized at every step. With each new step, one of the old Lagrange multipliers is removed from consideration and a new example whose output violates the Kuhn-Tucker conditions is added. The Osuna paper provides a proof that the quadratic problem will decrease with every step such that the Osuna method converges to a solution. However, the Osuna method still disadvantageously requires a numerical solution at each step. Although it converges to a solution, the Osuna method uses an entire numerical quadratic programming problem just to "fix" one Lagrange multiplier that violates the Kuhn-Tucker conditions.

A faster way to determine the weight vector is by using the method disclosed in U.S. patent application Ser. No. 09/055,477, by John Platt, entitled "Methods and Apparatus for Building a Support Vector Machine Classifier", filed on Apr. 6, 1998 and incorporated herein by reference. In a first disclosed methodology (also referred to as "QP1") of the Platt method, the threshold b is zero (0). First, the Lagrange multipliers, corresponding to each of examples of the training set, are initialized. For example, all of the Lagrange multipliers may be initialized by setting them to zero (0).

For each training example from the set of training examples, it is determined whether the solution is optimized for the example. Each example is examined for optimality by determining whether or not a Kuhn-Tucker condition is violated. If the solution is not optimal (e.g., if a Kuhn-Tucker condition is violated), then a new Lagrange multiplier for the $n^{th}$ training example is determined. More specifically, the new Lagrange multiplier for the $n^{th}$ training example may be determined by the following expression:

$$\alpha_n^{new} = \alpha_n^{old} + \frac{\text{Kuhn} - \text{Tucker Error}}{k(\vec{x}_n, \vec{x}_n)} \quad (14)$$

In the expression of equation (14), the Kuhn-Tucker (KT) Error may be expressed as:

$$1 - O_n y_n \quad (15)$$

In the expression of equation (14), the denominator is the kernel function which, in the case of a linear support vector machine, is the dot product of the feature vectors x of the $n^{th}$ training example.

The new Lagrange multiplier is then limited (or clipped) as follows:

$$\alpha_n^{new,clipped} = \begin{cases} 0 & \text{if } \alpha_n^{new} < 0 \\ \alpha_n^{new} & \text{if } 0 \leq \alpha_n^{new} \leq C \\ C & \text{if } \alpha_n^{new} > C \end{cases} \quad (16)$$

so that the inequality constraints are fulfilled.

Once the sweep through a set of training examples is complete, whether any of the Lagrange multipliers have changed during the sweep is determined. If so, then other examples may now violate the Kuhn-Tucker conditions. More specifically, as the Lagrange multipliers are adjusted, the separating hyperplane (or hypersurface) of the SVM changes. Hence, another sweep through the data is carried out. If no Lagrange multipliers were changed, then all the examples must fulfill the Kuhn-Tucker conditions and the QP1 process is terminated.

An initial sweep processes all examples of the training set. Assuming that a Lagrange multiplier was changed, the next sweep processes only the non-boundary examples of the training set. Subsequent sweeps also process only the non-boundary Lagrange multipliers until no Lagrange multipliers change. Then, the next sweep processes the entire set of training examples. If no Lagrange multipliers were changed, then processing ends. If, on the other hand, a Lagrange multiplier was changed, the processing continues as discussed above. Naturally, each sweep could process all of the training examples in the alternative.

In the case of linear SVMs, the entire SVM state may be stored as a weight vector rather than a weighted sum of kernels. In this case, the weight vector is directly updated when the Lagrange multiplier is changed. That is:

$$\vec{w} = (\alpha_i^{new} - \alpha_i^{old}) y_i \vec{x}_i \quad (17)$$

The Kuhn-Tucker conditions may be checked using interval arithmetic: namely, if the condition is approximately met within a certain tolerance, then condition is met. The tolerance may be set to 1e-3. This should be accurate enough for recognition machines, and will prevent the method from spending a large amount of computational resources generating unneeded precision in the Lagrange multipliers.

When the input points consist of sparse binary vectors (e.g., the object to be classified has relatively few of many possible features), the embodiment shown can be dramatically sped up by using a sparse evaluation of the dot product. Namely, the dot product between the weight and the input point is the sum of the weight elements that correspond to the non-zero input dimensions. This can be expressed as:

$$\vec{w} \cdot \vec{x}_i = \sum_{f = \text{all non-zero features of vector } \vec{x}_i} \vec{w}_f \quad (18)$$

This optimization is useful for training linear SVMs to be used for text classification since most text objects are represented by sparse feature vectors (e.g., text objects have relatively few of all words of a feature vector).

The alpha vector, which includes the values of the Lagrange multipliers for all training examples, may be stored as a vector of length equal to the size of the training set. That is:

$$\vec{\alpha} = \alpha_1, \ldots, \alpha_{nte} \quad (19)$$

wherein "nte" is the number of training examples.

Since, as stated above, most of the Lagrange multipliers will be zero (0), the alpha vector may be stored as two (2) vectors of length equal to the number of non-zero Lagrange multipliers, one storing the identity (index) of the non-zero Lagrange multiplier, the other storing the value of the non-zero Lagrange multiplier.

In a second disclosed methodology (also referred to as "QP2") of the Platt method, the quadratic programming process is subject to a linear equality constraint (i.e. the threshold b is not necessarily equal to zero (0)).

First, the Lagrange multipliers, corresponding to each of examples of the training set, are initialized. Recall that, since most of the Lagrange multipliers may be zero (0), all of the Lagrange multipliers may be initialized by setting them to zero (0). For each training example from the set of training examples, it is determined whether a Kuhn-Tucker condition is violated. If a Kuhn-Tucker condition is violated, another example is selected from the training set (as will be discussed below), thereby creating a pair of Lagrange multipliers to be jointly optimized. An attempt is made to determine new Lagrange multipliers such that the examples are jointly optimized. It is determined whether the examples were optimized. If they were not optimized, another feature vector is selected from the training set thereby creating another pair of Lagrange multipliers.

The first step in the joint optimization of the two (2) Lagrange multipliers is to determine the bounds on one of the variables. Either the first or the second multiplier can be bounded. Here, the second is chosen Let L be the lower bound on the second Lagrange multiplier and H be the higher bound on the second Lagrange multiplier. Let $y_1$ be the desired output of the first example and let $y_2$ be the desired output of the second example. Let $\alpha_1$, be the current value of the first Lagrange multiplier and $\alpha_2$ be the current value of the second Lagrange multiplier. If $y_1$ is the same as $y_2$, then the following bounds are computed:

$$H = \min(C, \alpha_1 + \alpha_2) \quad L = \max(0, \alpha_1 + \alpha_2 - C) \quad (20)$$

If $y_1$ is the opposite sign as $y_2$, then the bounds are computed as follows:

$$H = \min(C, C - \alpha_1 + \alpha_2) \quad L = \max(0, \alpha_2 - \alpha_1) \quad (21)$$

If the value L is the same as the value H, then no progress can be made and it is determined that the training examples were not optimized.

The new optimized value of $\alpha_2$ may be computed via the formula:

$$\alpha_2^{new} = \alpha_2 + \frac{y_1 y_2 KT\ ERROR_1 - KT\ ERROR_2}{k(\vec{x}_1, \vec{x}_1) + k(\vec{x}_2, \vec{x}_2) - 2k(\vec{x}_1, \vec{x}_2)} \quad (22)$$

If the new value of the second Lagrange multiplier is less than L, then it is set to L. Conversely, if the new value of the second Lagrange multiplier is greater than H, then it is set to H. If the new clipped (or limited) value of the second Lagrange multiplier is the same as the old value, then no optimization is possible it is determined that the training examples were not optimized. Otherwise, the new value of the first Lagrange multiplier is then derived from the clipped (or limited) value of the second Lagrange multiplier:

$$\alpha_1^{new} = \alpha_1 + y_1 y_2 (\alpha_2 - \alpha_2^{new.clipped}) \quad (23)$$

If the support vector machine is linear, then the weights and thresholds are updated to reflect the new Lagrange multipliers so that other violations of the Kuhn Tucker conditions can be detected.

The second Lagrange multiplier pair may be selected based on the following heuristic. The ideal second Lagrange multiplier would change the most upon joint optimization. An easy approximation to the change upon optimization is the absolute value of the numerator in the change in the second Lagrange multiplier:

$$|y_1 y_2 KT\ ERROR_1 - KT\ ERROR_2| = |(O_1 - y_1) - (O_2 - y_2)| \quad (24)$$

If the true error $(O_1 - y_1)$ of the first Lagrange multiplier is positive, then a second Lagrange multiplier that has a large negative true error $(O_2 - y_2)$ would be a good candidate for joint optimization. If the first true error is negative, then a second Lagrange multiplier that has a large positive true error would be a good candidate for optimization. Therefore, the QP2 process seeks out a non-boundary Lagrange multiplier ($\alpha \approx 0$ or C) that has a true error that is the most opposite of the true error of the first Lagrange multiplier.

There are some degenerate cases where different examples have the same input feature vectors. This could prevent the joint optimization from progressing. These redundant examples could be filtered out. Alternatively, a hierarchy of heuristics may be used to find a second example to make forward progress on the joint optimization step. If the first heuristic described above fails, the QP2 process will select a non-boundary Lagrange multiplier as the other Lagrange multiplier of the pair to be jointly optimized. If this heuristic fails for all non-boundary Lagrange multipliers, any of the other Lagrange multipliers may be selected as the other Lagrange multiplier of the pair.

Once the sweep through the set of training examples is complete, if one or more Lagrange multipliers changed with the sweep through the entire data set, the non-boundary Lagrange multipliers are then optimized. If, on the other hand, no Lagrange multipliers changed during the sweep, then all of the examples obey the Kuhn-Tucker conditions and the QP2 process is terminated.

As can been appreciated, the QP2 process first sweeps through all training examples of the training set. Assuming that a Lagrange multiplier was changed, the next sweep processes only the non-boundary training examples of the training set. Subsequent sweeps also process only the non-boundary Lagrange multipliers until no Lagrange multipliers change. Then, the next sweep processes the entire set of training examples. If no Lagrange multipliers change, processing ends. If, on the other hand, a Lagrange multiplier changes, the processing continues as discussed above. Naturally, in an alternative methodology, all training examples of the training set could be processed on every sweep.

The Lagrange multipliers can be stored as a either one array having a size corresponding to the number of training examples (also referred to as "the full array") or two (2) arrays that represent a larger sparse array.

The real error mentioned used when jointly optimizing a pair of Lagrange multipliers is the desired output of the SVM less the actual output of the SVM ($y_i - O_i$). These real errors may be cached for the examples that have a non-boundary (i.e., non-zero or a non-C) Lagrange multiplier. Caching the real errors allows an second example to be intelligently chosen.

For a linear SVM, the linear SVM may be stored as one weight vector, rather than as a linear superpositions of a set of input points. If the input vector is sparse, the update to the weight vector can be accomplished in a known sparse manner, also.

Thus, the weight vector w for a given category c can be determined by training an SVM, for example, based on one of the foregoing (e.g., Chunking, Osuna, and Platt) methods.

§ 4.2.1.4.2 MONOTONIC FUNCTION PARAMETER DETERMINATION

As discussed above, the text classifier employs a monotonic (e.g., sigmoid) function to classify textual information objects. A sigmoid function may be expressed in the form:

$$f(u) = \frac{1}{1 + e^u} \quad (25)$$

The characteristics of the sigmoid function may be adjusted using constants A and B (also referred to as "adjustable parameters") such that:

$$f(u) = \frac{1}{1 + e^{Au+B}} \quad (26)$$

Techniques for solving for A and B of the monotonic function are described below.

§ 4.2.1.4.2.1 OPTIMIZATION (MAXIMUM LIKELIHOOD)

The constants A and B may be determined by using a maximum likelihood on the set of training examples of textual information objects. In order to fit the sigmoid to the training data, the logarithm of the likelihood that the training targets y were generated by the probability distribution f, assuming independence between training examples, is computed. The log likelihood is described by:

$$\sum_{i=1}^{nte} y_i \log(f(\vec{x}_i)) + (1 - y_i)\log(1 - f(\vec{x}_i)) \quad (27)$$

where $y_i$ is a known result (+1 or −1); and nte is the number of training examples.

The optimal sigmoid parameters are then derived by maximizing the log likelihood over possible sigmoid parameters.

§ 4.2.1.4.2.1.1 KNOWN OPTIMIZATION METHODS

Expression (28) may be maximized based on known unconstrained optimization techniques such as gradient descent, Levenberg-Marquardt, Newton-Raphson, conjugate gradient, and variable metric methods for example.

§ 4.2.1.4.2.1.2 LAPLACE'S RULE OF SUCCESSION

In one embodiment, in expression (28) above, the $y_i$ values may be replaced by target values $t_i$, which may be expressed as:

$$t_i = \begin{cases} \dfrac{N_+ + 1}{N_+ + 2} & \text{if } y = +1 \\ 1 - \dfrac{N_- + 1}{N_- + 2} & \text{if } y = -1 \end{cases} \quad (29)$$

where $N_+$ is the number of textual information objects of the training set in the class; and $N_-$ is the number of textual information objects of the training set not in the class.

By using the target values $t_i$ rather than $y_i$, the resulting sigmoid function is no more precise than the data used to determine it. That is, the sigmoid function is not "overfit" to past data, particularly in categories with little training data. In this way, a sigmoid function is determined that matches unknown data given a prior that all probabilities are equally likely. Although the use of the target function $t_i$ of equation (30) has been presented in the context of a text classifier, it is applicable to other classifiers as well. Naturally, other target functions, which depend on the number of training examples in the positive and negative classes, could be used instead of the target function defined in equation (29).

In one embodiment of fitting a sigmoid to the training data, the target values ($tt_i$) expressed as:

$$tt_i = \begin{cases} \max(t_i, 0.99) & \text{if } y_i = +1 \\ \min(t_i, 0.01) & \text{if } y_i = -1 \end{cases} \quad (30)$$

are used. This version of the target function limits the effect of Laplace's rule of succession to be no farther away than 0.01 from the true target y. This has been empirically found to be desirable.

§ 4.2.2 EXEMPLARY STRUCTURE OF TEXT CLASSIFIER

Figure 2:
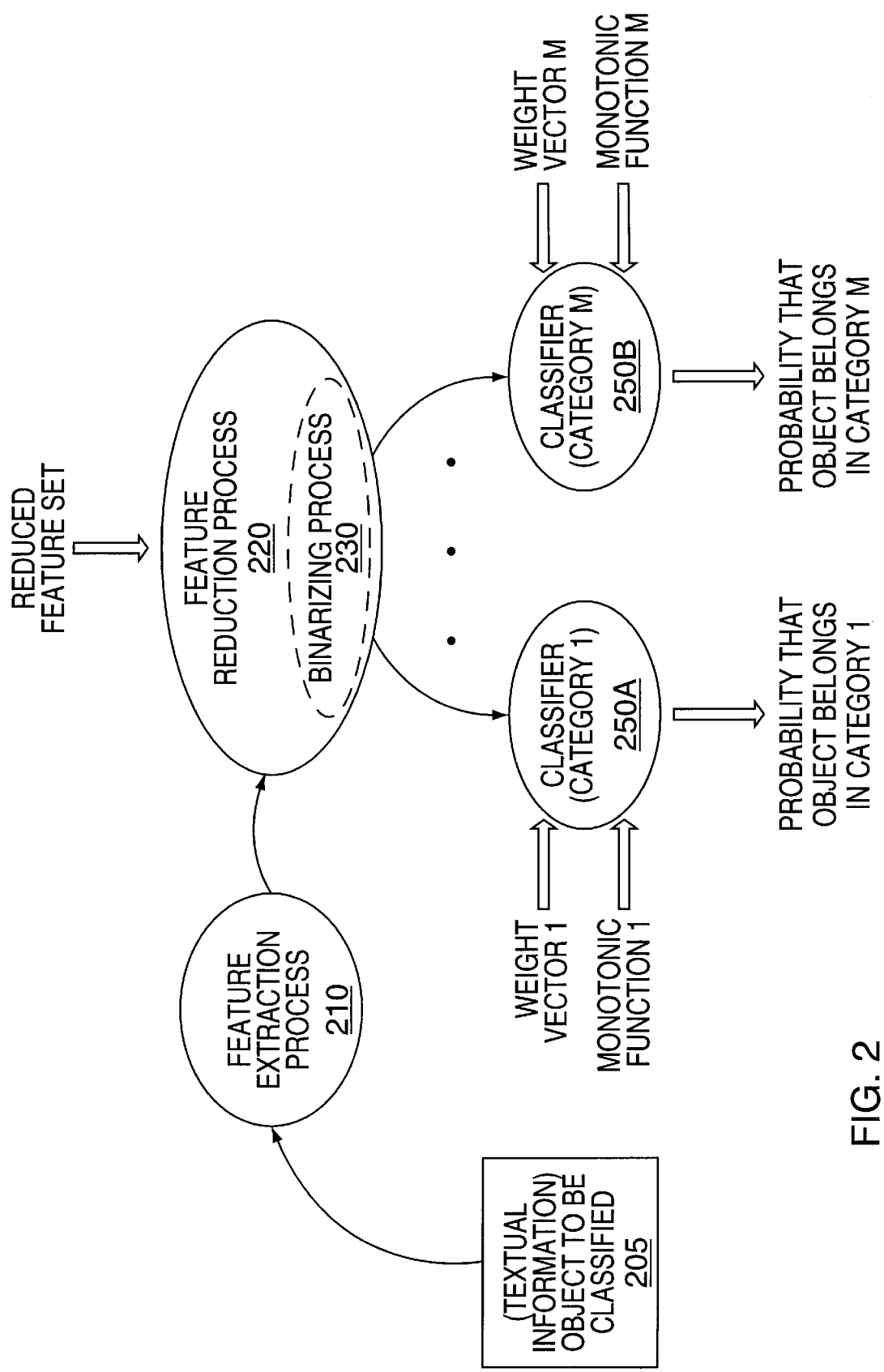
FIG. 2 is a high level diagram of processes that may be performed by a second aspect of the present invention.

FIG. 2 is a diagram of processes that may be used by a text classifier based on the present invention. As shown in FIG. 2, a textual information object 205 to be classified is applied to a feature extraction process (or more generally, a feature extractor) 210. As described in § 4.2.2.1 below, this feature extraction process 210 may be the same as the feature extraction process 110 discussed in § 4.2.1.1 above. Then, a feature reduction process (or more generally, a feature reduction facility) 220, described in § 4.2.2.2 below, using the set of reduced features generated by the feature reduction process 120 discussed in § 4.2.1.2 above, reduces the size of the feature vector associated with the textual information object 205. Thus, a reduced feature vector associated with the textual information object 205 is generated. As shown in FIG. 2, a binarizing process 230 may then be applied to the reduced feature vector.

The reduced feature vector generated by the feature reduction process 220 (or the binarized reduced feature vector generated by the binarizing process 230) is applied to one or more classifiers 250. These classifiers 250 may use a classification process described in § 4.2.2.4 below. The weight parameter w and the parameters of the parameterizable monotonic function for each classifier 250 are those determined by the classification engine parameter generation process(es) 140 discussed in § 4.2.1.4 above. A probability that the textual information object 205 belongs to a particular class is output.

§ 4.2.2.1 FEATURE EXTRACTION

The feature extraction process 210 may be analogous to the feature extraction process 110 discussed in § 4.2.1.1 above with reference to FIGS. 1 and 6.

§ 4.2.2.2 FEATURE REDUCTION

An exemplary feature reduction process 220 is now described. Recall that the feature reduction process 120 discussed above reduces (e.g., based on category independent and category dependent techniques) the feature vectors corresponding to the textual information objects of the set of training examples 115. This process 120 also produces a reduced feature set, which may be an index to features deemed relevant or important for the text classification. For example, if the original feature vector included 100 elements, the reduced feature set may include an index to the $2^{nd}$, $5^{th}$, $20^{th}$, $21^{st}$, and $89^{th}$ elements of the feature of the vector. Thus, the 100 element feature vector is reduced to a five (5) element reduced feature vector. Typically, the number of elements in the feature vector and reduced feature vector will be much larger than those used in this illustration.

The exemplary feature reduction process 220 uses the index of relevant or important features to map the values of the features to sequential indices of the reduced feature vector. Following the foregoing simplified example, the value of the $2^{nd}$ element would be placed in the first element of the reduced feature vector, the value of the $5^{th}$ element would be placed in the second element of the reduced feature vector, the value of the $20^{th}$ element would be placed in the third element of the reduced feature vector, the value of the $21^{st}$ element would be placed in the fourth element of the reduced feature vector and the value of the $89^{th}$ element would be placed in the fifth element of the reduced feature vector. As discussed in § 4.2.1 above, in practice, a textual information object is not represented by a single feature vector array, but rather, using sparse techniques known to those skilled in the art, it is represented by smaller feature index and value arrays.

Note that the reduced feature set may be provided to the feature extraction process 210. In this case, the feature extraction process only extracts those features belonging to the reduced feature set. In this way, a feature reduction is carried out while the features are being extracted.

§ 4.2.2.3 BINARIZATION

The optional binarizing process 230 may be analogous to the binarizing process 150 discussed in § 4.2.1.3 above with reference to FIG. 1.

§ 4.2.2.4 CLASSIFICATION

The classification processes 250 may be effected as follows. The probability that the textual information object 205 (as represented by reduced feature vector x) is in category i can be expressed as:

$$P(\vec{x}, i) = f_i(\vec{w}_i \cdot \vec{x}) = \frac{1}{1 + \exp(A_i(\vec{w}_i \cdot \vec{x}) - B_i)} \quad (31)$$

This text classifier has a number of advantages. First, the probabilities output by the classifiers of the various categories can be compared across categories. Second, if the target technique, described in § 4.2.1.4.2.1.2 above is used for determining the monotonic function and its adjustable parameters, that function will not be overfit when relatively small amounts of training data are available for a particular category.

§4.2.3 EXEMPLARY ARCHITECTURE

Figure 11A:
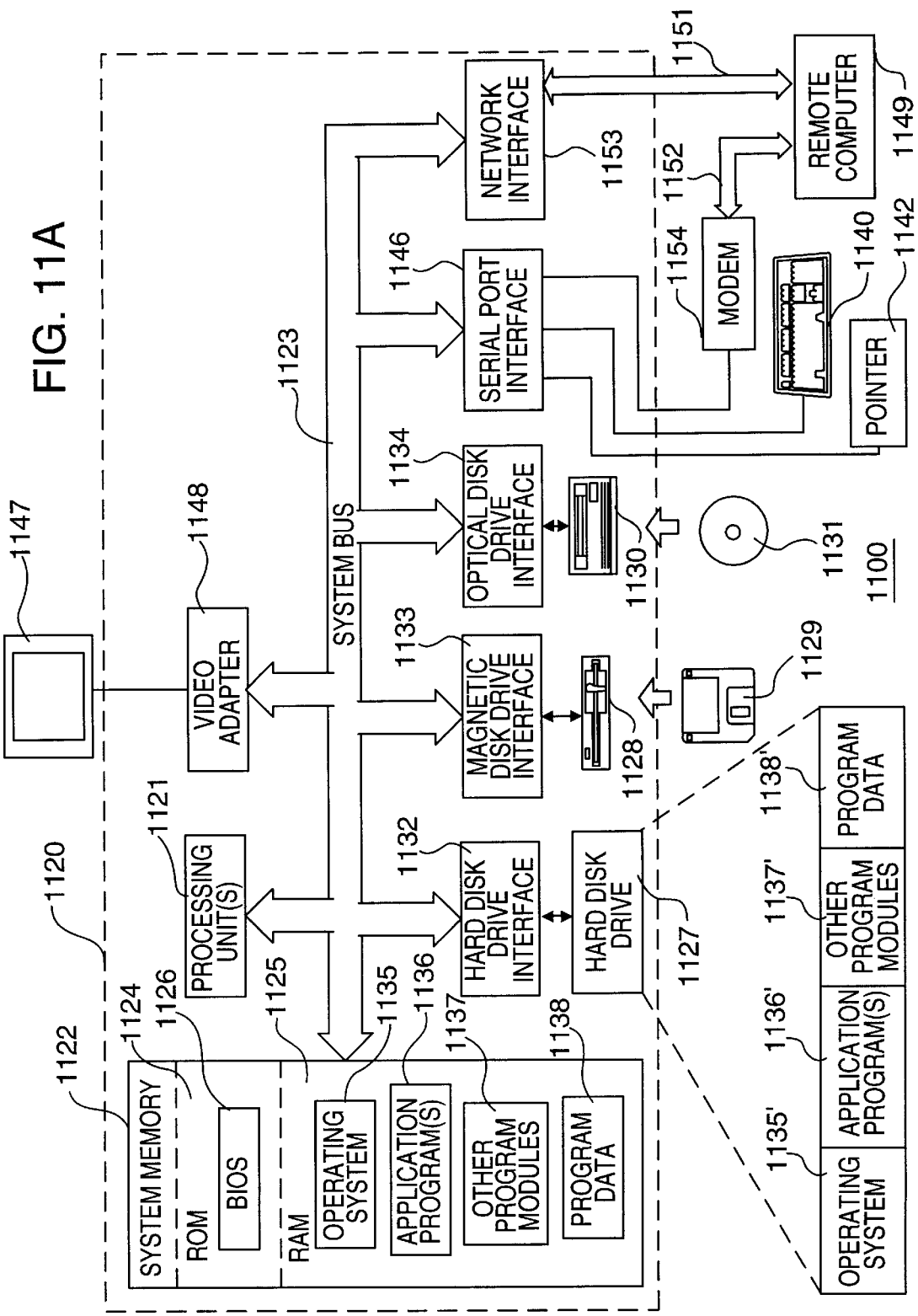
FIG. 11A is a block diagram of a computer environment which may be used to effect processes carried out by the present invention.

FIG. 11A and the following discussion provide a brief, general description of an exemplary apparatus in which at least some aspects of the present invention may be implemented. The present invention will be described in the general context of computer-executable instructions, such as program modules, being executed by a personal computer. However, the methods of the present invention may be effected by other apparatus. Program modules may include routines, programs, objects, components, data structures, etc. that perform a task(s) or implement particular abstract data types. Moreover, those skilled in the art will appreciate that at lease some aspects of the present invention may be practiced with other configurations, including hand-held devices, multiprocessor systems, microprocessor-based or programmable consumer electronics, network computers, minicomputers, set top boxes, mainframe computers, and the like. At least some aspects of the present invention may also be practiced in distributed computing environments where tasks are performed by remote processing devices linked through a communications network. In a distributed computing environment, program modules may be located in local and/or remote memory storage devices.

With reference to FIG. 11A, an exemplary apparatus 1100 for implementing at least some aspects of the present invention includes a general purpose computing device in the form of a conventional personal computer 1120. The personal computer 1120 may include a processing unit 1121, a system memory 1122, and a system bus 1123 that couples various system components including the system memory to the processing unit 1121. The system bus 1123 may be any of several types of bus structures including a memory bus or memory controller, a peripheral bus, and a local bus using any of a variety of bus architectures. The system memory may include read only memory (ROM) 1124 and/or random access memory (RAM) 1125. A basic input/output system 1126 (BIOS), containing basic routines that help to transfer information between elements within the personal computer 1120, such as during start-up, may be stored in ROM 1124. The personal computer 1120 may also include a hard disk drive 1127 for reading from and writing to a hard disk, (not shown), a magnetic disk drive 1128 for reading from or writing to a (e.g., removable) magnetic disk 1129, and an optical disk drive 1130 for reading from or writing to a removable (magneto) optical disk 1131 such as a compact disk or other (magneto) optical media. The hard disk drive 1127, magnetic disk drive 1128, and (magneto) optical disk drive 1130 may be coupled with the system bus 1123 by a hard disk drive interface 1132, a magnetic disk drive interface 1133, and a (magneto) optical drive interface 1134, respectively. The drives and their associated storage media provide nonvolatile storage of machine readable instructions, data structures, program modules and other data for the personal computer 1120. Although the exemplary environment described herein employs a hard disk, a removable magnetic disk 1129 and a removable optical disk 1131, those skilled in the art will appreciate that other types of storage media, such as magnetic cassettes, flash memory cards, digital video disks, Bernoulli cartridges, random access memories (RAMs), read only memories (ROM), and the like, may be used instead of, or in addition to, the storage devices introduced above.

A number of program modules may be stored on the hard disk 1123, magnetic disk 1129, (magneto) optical disk 1131, ROM 1124 or RAM 1125, such as an operating system 1135, one or more application programs 1136, other program modules 1137, and/or program data 1138 for example. A user may enter commands and information into the personal computer 1120 through input devices, such as a keyboard 1140 and pointing device 1142 for example. Other input devices (not shown) such as a microphone, joystick, game pad, satellite dish, scanner, or the like may also be included. These and other input devices are often connected to the processing unit 1121 through a serial port interface 1146 coupled to the system bus. However, input devices may be connected by other interfaces, such as a parallel port, a game port or a universal serial bus (USB). A monitor 1147 or other type of display device may also be connected to the system bus 1123 via an interface, such as a video adapter 1148 for example. In addition to the monitor, the personal computer 1120 may include other peripheral output devices (not shown), such as speakers and printers for example.

The personal computer 1120 may operate in a networked environment which defines logical connections to one or more remote computers, such as a remote computer 1149. The remote computer 1149 may be another personal computer, a server, a router, a network PC, a peer device or other common network node, and may include many or all of the elements described above relative to the personal computer 1120, although only a memory storage device 1150 has been illustrated in FIG. 11A. The logical connections depicted in FIG. 11A include a local area network (LAN) 1151 and a wide area network (WAN) 1152, an intranet and the Internet.

When used in a LAN, the personal computer 1120 may be connected to the LAN 1151 through a network interface adapter (or "NIC") 1153. When used in a WAN, such as the Internet, the personal computer 1120 may include a modem 1154 or other means for establishing communications over the wide area network 1152. The modem 1154, which may be internal or external, may be connected to the system bus 1123 via the serial port interface 1146. In a networked environment, at least some of the program modules depicted relative to the personal computer 1120 may be stored in the remote memory storage device. The network connections shown are exemplary and other means of establishing a communications link between the computers may be used.

Figure 11B:
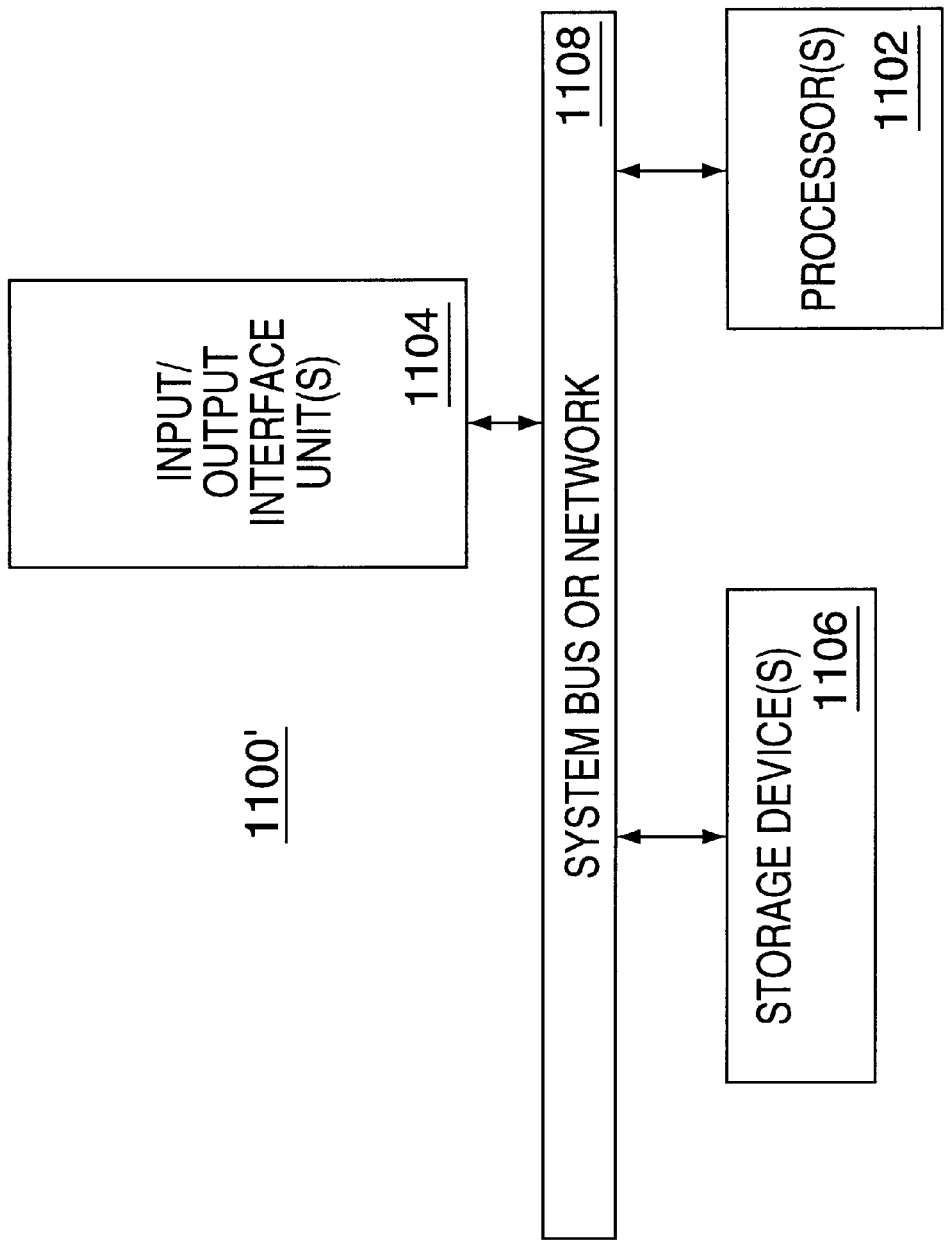
FIG. 11B is a block diagram of a machine which may be used to effect processes carried out by the present invention.

FIG. 11B is a more general machine 1100 which may effect one or more of the processes discussed above. The machine 1100 basically includes a processor(s) 1102, an input/output interface unit(s) 1104, a storage device(s) 1106, and a system bus or network 1108 for facilitating data and control communications among the coupled elements. The processor(s) 1102 may execute machine-executable instructions to effect one or more aspects of the present invention. At least a portion of the machine executable instructions may be stored (temporarily or more permanently) on the storage devices (1106) and/or may be received from an external source via an input interface unit 1104.

§ 4.2.4 CONCLUSIONS

Thus, methods and apparatus for classifying text and building a text classifier have been disclosed. The methods and apparatus advantageously: (i) reduce the size of a feature vector representing a textual information object while maintaining the features important for classification; (ii) avoid generating a classifier overfit to relatively low amounts of training data; (iii) train relatively fast; and/or (iv) classify relatively fast.

What is claimed is:

1. A method for generating, from a training set of textual information objects, each either belonging to a category or not, parameters of a classifier for determining whether or not a textual information object belongs to the category, the method comprising steps of:
   a) extracting features from the textual information objects to generate, for each textual information object of the training set, an associated feature vector having a number of features;
   b) reducing the number of features of each of the feature vectors to generated, for each textual information object of the training set, an associated reduced feature vector;
   c) determining a weight vector for the classifier by training a support vector machine; and
   d) determining a monotonic function to be used by the classifier.

2. The method of claim 1 wherein the step of reducing the number of features includes sub-steps of:
   i) reducing the number of features based on Zipf's Law; and
   ii) further reducing the number of features based on at least one criteria selected from a group of criteria consisting of (a) mutual information, (b) information gain, (c) Bayesian score, (d) chi-square, (e) correlation coefficient, and (f) singular value decomposition.

3. The method of claim 1 wherein the step of determining a monotonic function to be used by the classifier includes a step of determining parameters of the monotonic function by maximizing a likelihood of the training set of textual information objects given an output of the monotonic function.

4. The method of claim 3 wherein the step of determining parameters of the monotonic function by maximizing a likelihood of the training set of textual information objects given an output of the monotonic function uses a target value $t_i$ defined as:

$$t_i = \begin{cases} \dfrac{N_+ + 1}{N_+ + 2} & \text{if } y = +1 \\ 1 - \dfrac{N_- + 1}{N_- + 2} & \text{if } y = -1 \end{cases}$$

where $N_+$ is a number of textual information objects of the training set in the category and $N_-$ is a number of textual information objects not in the category.

5. The method of claim 3 wherein the step of determining parameters of the monotonic function by maximizing a likelihood of the training set of textual information objects given an output of the monotonic function uses a target value derived from a number of textual information objects of the training set in the category and a number of textual information objects of the training set not in the category.

6. A method for generating, from a set of reduced feature vectors associated with a training set of textual information objects, each either belonging to a category or not, parameters of a classifier for determining whether or not a textual information object belongs to the category, the method comprising steps of:
   a) determining a weight vector for the classifier by training a support vector machine; and
   b) determining a monotonic function to be used by the classifier.

7. The method of claim 6 wherein the step of determining a monotonic function to be used by the classifier includes a step of determining parameters of the monotonic function by maximizing a likelihood of the training set of textual information objects given an output of the monotonic function.

8. The method of claim 7 wherein the step of determining parameters of the monotonic function by maximizing a likelihood of the training set of textual information objects given an output of the monotonic function uses a target value $t_i$ defined as:

$$t_i = \begin{cases} \dfrac{N_+ + 1}{N_+ + 2} & \text{if } y = +1 \\ 1 - \dfrac{N_- + 1}{N_- + 2} & \text{if } y = -1 \end{cases}$$

where $N_+$ is a number of textual information objects of the training set in the category and $N_-$ is a number of textual information objects not in the category.

9. The method of claim 7 wherein the step of determining parameters of the monotonic function by maximizing a likelihood of the training set of textual information objects given an output of the monotonic function uses a target value derived from a number of textual information objects of the training set in the category and a number of textual information objects of the training set not in the category.

10. A method for generating, from a set of feature vectors associated with a training set of textual information objects, each either belonging to a category or not, parameters of a classifier for determining whether or not a textual information object belongs to the category, the method comprising steps of:
  a) reducing the number of features of each of the feature vectors to generated, for each textual information object of the training set, an associated reduced feature vector;
  b) determining a weight vector for the classifier by training support vector machine; and
  c) determining a monotonic function to be used by the classifier.

11. The method of claim 10 wherein the step of reducing the number of features includes sub-steps of:
  i) reducing the number of features based on Zipf's Law; and
  ii) further reducing the number of features based on at least one criteria selected from a group of criteria consisting of (a) mutual information, (b) information gain, (c) Bayesian score, (d) chi-square, (e) correlation coefficient, and (f) singular value decomposition.

12. The method of claim 10 wherein the step of determining a monotonic function to be used by the classifier includes a step of determining parameters of the monotonic function by maximizing a likelihood of the training set of textual information objects given an output of the monotonic function.

13. The method of claim 12 wherein the step of determining parameters of the monotonic function by maximizing a likelihood of the training set of textual information objects given an output of the monotonic function uses a target value $t_i$ defined as:

$$t_i = \begin{cases} \dfrac{N_+ + 1}{N_+ + 2} & \text{if } y = +1 \\ 1 - \dfrac{N_- + 1}{N_- + 2} & \text{if } y = -1 \end{cases}$$

where $N_+$ is a number of textual information objects of the training set in the category and $N_-$ is a number of textual information objects not in the category.

14. The method of claim 12 wherein the step of determining parameters of the monotonic function by maximizing a likelihood of the training set of textual information objects given an output of the monotonic function uses a target value derived from a number of textual information objects of the training set in the category and a number of textual information objects of the training set not in the category.

15. An apparatus for generating, from a training set of textual information objects, each either belonging to a category or not, parameters of a classifier for determining whether or not a textual information object belongs to the category, the apparatus comprising:
  a) a feature extractor for extracting features from the textual information objects to generate, for each textual information object of the training set, an associated feature vector having a number of features;
  b) a feature reduction facility for reducing the number of features of each of the feature vectors to generated, for each textual information object of the training set, an associated reduced feature vector;
  c) a support vector machine training facility for determining a weight vector for the classifier; and
  d) a function generator for determining a monotonic function to be used by the classifier.

16. The apparatus of claim 17 wherein the function generator includes means for determining parameters of the monotonic function by maximizing a likelihood of the training set of textual information objects given an output of the monotonic function.

17. The apparatus of claim 16 wherein the means for determining parameters of the monotonic function by maximizing a likelihood of the training set of textual information objects given an output of the monotonic function use a target value $t_i$ defined as:

$$t_i = \begin{cases} \dfrac{N_+ + 1}{N_+ + 2} & \text{if } y = +1 \\ 1 - \dfrac{N_- + 1}{N_- + 2} & \text{if } y = -1 \end{cases}$$

where $N_+$ is a number of textual information objects of the training set in the category and $N_-$ is a number of textual information objects not in the category.

18. The apparatus of claim 16 wherein the means for determining parameters of the monotonic function by maximizing a likelihood of the training set of textual information objects given an output of the monotonic function use a target value derived from a number of textual information objects of the training set in the category and a number of textual information objects of the training set not in the category.

19. An apparatus for generating, from a set of reduced feature vectors associated with a training set of textual information objects, each either belonging to a category or not, parameters of a classifier for determining whether or not a textual information object belongs to the category, the apparatus comprising:
  a) a support vector machine training facility for determining a weight vector for the classifier; and
  b) a function generator for determining a monotonic function to be used by the classifier.

20. The apparatus of claim 19 wherein the function generator includes means for determining parameters of the monotonic function by maximizing a likelihood of the training set of textual information objects given an output of the monotonic function.

21. The apparatus of claim 20 wherein the means for determining parameters of the monotonic function by maximizing a likelihood of the training set of textual information objects given an output of the monotonic function uses a target value $t_i$ defined as:

$$t_i = \begin{cases} \dfrac{N_+ + 1}{N_+ + 2} & \text{if } y = +1 \\ 1 - \dfrac{N_- + 1}{N_- + 2} & \text{if } y = -1 \end{cases}$$

where $N_+$ is a number of textual information objects of the training set in the category and $N_-$ is a number of textual information objects not in the category.

22. The apparatus of claim 20 wherein the step of determining parameters of the monotonic function by maximizing a likelihood of the training set of textual information objects given an output of the monotonic function uses a target value derived from a number of textual information objects of the training set in the category and a number of textual information objects of the training set not in the category.

23. An apparatus for generating, from a set of feature vectors associated with a training set of textual information objects, each either belonging to a category or not, parameters of a classifier for determining whether or not a textual information object belongs to the category, the apparatus comprising:
  a) a feature reduction facility for reducing the number of features of each of the feature vectors to generated, for each textual information object of the training set, an associated reduced feature vector;
  b) a support vector machine training facility for determining a weight vector for the classifier; and
  c) a function generator for determining a monotonic function to be used by the classifier.

24. The apparatus of claim 23 wherein the function generator includes means for determining parameters of the monotonic function by maximizing a likelihood of the training set of textual information objects given an output of the monotonic function.

25. The apparatus of claim 24 wherein the means for determining parameters of the monotonic function by maximizing a likelihood of the training set of textual information objects given an output of the monotonic function uses a target value $t_i$ defined as:

$$t_i = \begin{cases} \dfrac{N_+ + 1}{N_+ + 2} & \text{if } y = +1 \\ 1 - \dfrac{N_- + 1}{N_- + 2} & \text{if } y = -1 \end{cases}$$

where $N_+$ is a number of textual information objects of the training set in the category and $N_-$ is a number of textual information objects not in the category.

26. The apparatus of claim 24 wherein the means for determining parameters of the monotonic function by maximizing a likelihood of the training set of textual information objects given an output of the monotonic function uses a target value derived from a number of textual information objects of the training set in the category and a number of textual information objects of the training set not in the category.

27. A method for classifying a textual information object as belonging to or not belonging to a category, the method comprising steps of:
  a) extracting features from the textual information object to generate a feature vector associated with the textual information object;
  b) reducing features of the feature vector to generate a reduced feature vector; and
  c) applying the reduced feature vector and a weight vector to a classification function defined as:

$$f(i) = \frac{1}{1 + e^{A(\vec{w} \cdot \vec{x}) + B}}.$$

28. The method of claim 27 wherein the weight vector is determined from a training set of textual information objects having a predetermined classification applied to a support vector machine training facility.

29. A method for classifying a reduced feature vector, associated with a textual information object, as belonging to or not belonging to a category, the method comprising steps of:
  a) accepting a weight vector parameter;
  b) accepting a classification function defined as;

$$f(i) = \frac{1}{1 + e^{A(\vec{w} \cdot \vec{x}) + B}}$$

and
  c) applying the reduced feature vector and the accepted weight vector parameter to the accepted classification function.

30. The method of claim 29 wherein the weight vector is determined from a training set of textual information objects having a predetermined classification applied to a support vector machine training facility.

31. A method for classifying a feature vector, associated with a textual information object, as belonging to or not belonging to a category, the method comprising steps of:
  a) reducing features of the feature vector to generate a reduced feature vector; and
  b) applying the reduced feature vector and a weight vector to a classification function defined as:

$$f(i) = \frac{1}{1 + e^{A(\vec{w} \cdot \vec{x}) + B}}.$$

32. The method of claim 31 wherein the weight vector is determined from a training set of textual information objects having a predetermined classification applied to a support vector machine training facility.

33. An apparatus for classifying a textual information object as belonging to or not belonging to a category, the apparatus comprising:
  a) a feature extractor for extracting features from the textual information object to generate a feature vector associated with the textual information object;
  b) a feature reduction facility for reducing features of the feature vector to generate a reduced feature vector; and
  c) a classifier for applying the reduced feature vector and a weight vector to a classification function defined as:

$$f(i) = \frac{1}{1 + e^{A(\vec{w} \cdot \vec{x}) + B}}.$$

34. The apparatus of claim 33 wherein the weight vector is determined from a training set of textual information objects having a predetermined classification applied to a support vector machine training facility.

35. An apparatus for classifying a reduced feature vector, associated with a textual information object, as belonging to or not belonging to a category, the apparatus comprising:

a) a first input for accepting a weight vector parameter;
b) a second input for accepting a classification function; and
c) a classifier for applying the reduced feature vector and the accepted weight vector parameter to the accepted classification function defined as:

$$f(i) = \frac{1}{1 + e^{A(\vec{w}\cdot\vec{x})+B}}.$$

36. The apparatus of claim 35 wherein the weight vector is determined from a training set of textual information objects having a predetermined classification applied to a support vector machine training facility.

37. An apparatus for classifying a feature vector, associated with a textual information object, as belonging to or not belonging to a category, the apparatus comprising:
a) a feature reduction facility for reducing features of the feature vector to generate a reduced feature vector; and
b) a classifier for applying the reduced feature vector and a weight vector to a classification function defined as:

$$f(i) = \frac{1}{1 + e^{A(\vec{w}\cdot\vec{x})+B}}.$$

38. The apparatus of claim 37 wherein the weight vector is determined from a training set of textual information objects having a predetermined classification applied to a support vector machine training facility.

39. A method for generating, from a training set of objects, each object either belonging to a category or not, parameters of a sigmoid function of a classifier for determining whether or not an object belongs to the category, the method comprising steps of:
a) determining a target value based on a number of objects of the training set in the category and a number of objects of the training set not in the category; and
b) determining the parameters of the sigmoid function by maximizing a likelihood of the training set of textual information objects given an output of the monotonic function using the determined target value.

40. The method of claim 39 wherein the target value $t_i$ is defined as:

$$t_i = \begin{cases} \dfrac{N_+ + 1}{N_+ + 2} & \text{if } y = +1 \\ 1 - \dfrac{N_- + 1}{N_- + 2} & \text{if } y = -1 \end{cases}$$

where $N_+$ is a number of textual information objects of the training set in the category and $N_-$ is a number of textual information objects not in the category.

41. The method of claim 39 wherein the target is limited to a maximum of the target value ($t_i$) and 0.99 if the object belongs to the category and the minimum of the target value ($t_i$) and 0.01 if the object does not belong to the category.

42. An apparatus for generating, from a training set of objects, each object either belonging to a category or not, parameters of a sigmoid function of a classifier for determining whether or not an object belongs to the category, the apparatus comprising:
a) a target value generator for determining a target value based on a number of objects of the training set in the category and a number of objects of the training set not in the category; and
b) means for determining parameters of the sigmoid functions by maximizing a likelihood of the training set of objects using the determined target value.

43. The apparatus of claim 42 wherein the target value $t_i$ is defined as:

$$t_i = \begin{cases} \dfrac{N_+ + 1}{N_+ + 2} & \text{if } y = +1 \\ 1 - \dfrac{N_- + 1}{N_- + 2} & \text{if } y = -1 \end{cases}$$

where $N_+$ is a number of textual information objects of the training set in the category and $N_-$ is a number of textual information objects not in the category.

44. The apparatus of claim 43 wherein the target value is limited to a maximum of the target value ($t_i$) and 0.99 if the object belongs to the category and the minimum of the target value ($t_i$) and 0.01 if the object does not belong to the category.

* * * * *

UNITED STATES PATENT AND TRADEMARK OFFICE
CERTIFICATE OF CORRECTION

PATENT NO. : 6,192,360 B1
DATED : February 20, 2001
INVENTOR(S) : Susan T. Dumais et al.

It is certified that error appears in the above-identified patent and that said Letters Patent is hereby corrected as shown below:

Column 4,
Line 43, replace "1.2.2.2.2.3" with -- 1.2.2.2.3 --

Column 26,
Line 2, replace "to generated" with -- to be generated --

Column 28,
Lines 11 and 25, replace "to generated" with -- to be generated --

Column 29,
Line 11, replace "to generated" with -- to be generated --

Column 31,
Line 41, remove "textual information"
Line 42, replace "the" with -- a --

Column 32,
Line 25, replace "functions" with -- function --

Signed and Sealed this

Thirty-first Day of August, 2004

JON W. DUDAS
*Director of the United States Patent and Trademark Office*